(12) United States Patent
Williams et al.

(10) Patent No.: US 10,359,134 B2
(45) Date of Patent: Jul. 23, 2019

(54) COMPONENT RETAINING STRUCTURE FOR CONDUIT FITTING

(71) Applicant: Swagelok Company, Solon, OH (US)

(72) Inventors: Peter C. Williams, Cleveland Heigths, OH (US); Prasanna Bhamidipati, Twinsburg, OH (US); Jeffrey Michael Rubinski, Novelty, OH (US); Mark A. Clason, Orwell, OH (US); Cal R. Brown, Lyndhurst, OH (US); Jeffrey S. Rayle, Rocky River, OH (US); John D. Karkosiak, Broadview Heights, OH (US); Mark A. Bennett, Bainbridge Township, OH (US); Mark D. Bearer, Akron, OH (US); Douglas S. Welch, Chesterland, OH (US); Ronald P. Campbell, Shaker Heights, OH (US); Douglas J. McClure, Mentor, OH (US); Gregory S. Kalata, Avon, OH (US); Connor M. Dorony, Lakewood, OH (US); Stephen J. Zaborski, Northfield Center, OH (US); Dale C. Arstein, Highland Heights, OH (US)

(73) Assignee: Swagelok Company, Solon, OH (US)

( * ) Notice: Subject to any disclaimer, the term of this patent is extended or adjusted under 35 U.S.C. 154(b) by 212 days.

(21) Appl. No.: 15/248,288

(22) Filed: Aug. 26, 2016

(65) Prior Publication Data

US 2017/0059065 A1 Mar. 2, 2017

Related U.S. Application Data

(60) Provisional application No. 62/210,146, filed on Aug. 26, 2015.

(51) Int. Cl.
*F16L 19/06* (2006.01)
*F16L 19/10* (2006.01)

(52) U.S. Cl.
CPC ............. *F16L 19/06* (2013.01); *F16L 19/103* (2013.01)

(58) Field of Classification Search
CPC ......... F16L 19/06; F16L 19/065; F16L 19/08; F16L 19/10; F16L 19/103; F16L 19/106
(Continued)

(56) References Cited

U.S. PATENT DOCUMENTS

| 859,573 A | 7/1907 | McMillan |
| 1,906,266 A | 5/1933 | Hoffman |

(Continued)

FOREIGN PATENT DOCUMENTS

| CN | 201363452 | 12/2009 |
| CN | 202056344 | 11/2011 |

(Continued)

OTHER PUBLICATIONS

International Search Report and Written Opinion from PCT/US2017/015019 dated May 19, 2017.

(Continued)

*Primary Examiner* — Aaron M Dunwoody
(74) *Attorney, Agent, or Firm* — Calfee, Halter & Griswold LLP

(57) ABSTRACT

A conduit fitting preassembly includes an annular fitting component and at least a first conduit gripping device. The annular fitting component has an interior wall extending axially from a forward end to a rearward end, and a first projection extending radially inward from the interior wall. The first conduit gripping device is received within the annular fitting component and includes a second projection extending radially outward of an outer surface of the first conduit gripping device. The first projection includes an outward tapered rear surface and the second projection includes an inward tapered front surface. The rear surface of (Continued)

the first projection is radially aligned with the front surface of the second projection, such that when the first conduit gripping device is in a forward-most position, the first projection interlocks with the second projection to prevent axial withdrawal of the first conduit gripping device from the annular fitting component.

21 Claims, 22 Drawing Sheets

(58) Field of Classification Search
USPC .................. 285/339, 343, 354, 289, 382.7
See application file for complete search history.

(56) References Cited

U.S. PATENT DOCUMENTS

| | | | |
|---|---|---|---|
| 1,973,418 A | 9/1934 | Sibley | |
| 2,547,889 A * | 4/1951 | Richardson | F16L 19/04 285/331 |
| 2,839,074 A | 6/1958 | Kaiser | |
| 3,075,793 A | 1/1963 | Lennon et al. | |
| 3,077,201 A | 2/1963 | Dumm | |
| 3,077,895 A | 2/1963 | Vickery | |
| 3,168,280 A | 2/1965 | Mueller | |
| 3,472,270 A | 10/1969 | Masheder | |
| 3,588,042 A | 6/1971 | Yopp | |
| 3,675,893 A | 7/1972 | Avelines | |
| 4,342,330 A | 8/1982 | Wieveg et al. | |
| 4,936,545 A | 6/1990 | Ferrero | |
| 5,188,335 A | 2/1993 | Pettinaroli | |
| 5,360,036 A | 11/1994 | Kieper | |
| 5,361,801 A | 11/1994 | Kerpan et al. | |
| 5,833,277 A * | 11/1998 | Reinert | F16L 37/092 285/39 |
| 6,425,571 B1 | 7/2002 | Schadewald et al. | |
| 6,508,493 B1 * | 1/2003 | Guivarc'h | F16L 19/0231 285/354 |
| 6,640,457 B2 | 11/2003 | Williams et al. | |
| 6,988,709 B2 | 1/2006 | Scaramucci | |
| 7,234,682 B2 | 6/2007 | Kitazawa et al. | |
| 7,306,010 B2 | 12/2007 | Gruener, Sr. | |
| 7,506,665 B2 | 3/2009 | Gruener, Sr. | |
| 7,681,865 B2 | 3/2010 | Furnival | |
| 8,007,013 B2 | 8/2011 | Arstein et al. | |
| 8,783,656 B2 | 7/2014 | Allison | |
| 8,783,657 B2 | 7/2014 | Yang et al. | |
| 8,919,825 B2 * | 12/2014 | Nakata | F16L 19/10 285/339 |
| 8,931,810 B2 | 1/2015 | Clason et al. | |
| 10,024,468 B2 | 7/2018 | Trivett et al. | |
| 2002/0145126 A1 | 10/2002 | Lian | |
| 2004/0041399 A1 * | 3/2004 | Chelchowski | F16L 19/086 285/343 |
| 2004/0178382 A1 | 9/2004 | Yun | |
| 2010/0148501 A1 | 6/2010 | Bennett et al. | |
| 2011/0181042 A1 * | 7/2011 | Clason | F16L 19/103 285/343 |
| 2011/0260088 A1 | 10/2011 | Cunningham | |
| 2013/0106103 A1 * | 5/2013 | Horsfall | F16L 19/10 285/341 |
| 2014/0232111 A1 * | 8/2014 | Shimamura | F16L 19/103 285/389 |
| 2015/0323110 A1 | 11/2015 | Trivett et al. | |
| 2017/0059065 A1 * | 3/2017 | Williams | F16L 19/06 |
| 2017/0227151 A1 | 8/2017 | Williams | |
| 2017/0261137 A1 * | 9/2017 | Williams | F16L 19/103 |
| 2018/0195651 A1 | 7/2018 | Williams | |

FOREIGN PATENT DOCUMENTS

| | | |
|---|---|---|
| CN | 203009892 | 6/2013 |
| CN | 104350314 | 2/2015 |
| CN | 204187036 | 3/2015 |
| CN | 204922080 | 12/2015 |
| EP | 2180221 | 4/2010 |
| EP | 2762759 | 8/2014 |
| MX | 2009009674 | 3/2010 |
| WO | 2008/051955 | 5/2008 |
| WO | 2010/068762 | 6/2010 |
| WO | 2017/035439 | 3/2017 |

OTHER PUBLICATIONS

International Search Report and Written Opinion from PCT/US2016/048891 dated Jan. 13, 2017.

* cited by examiner

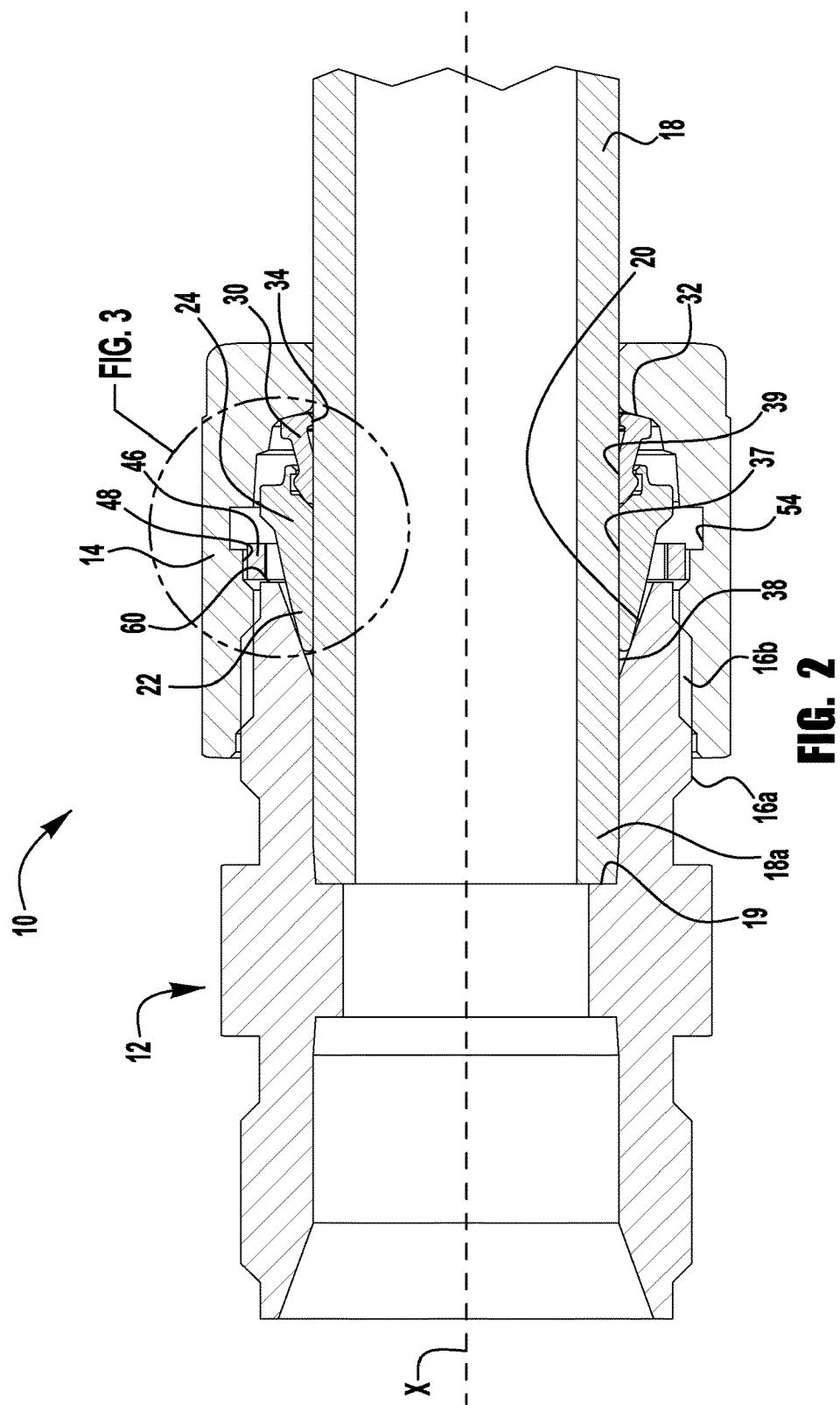

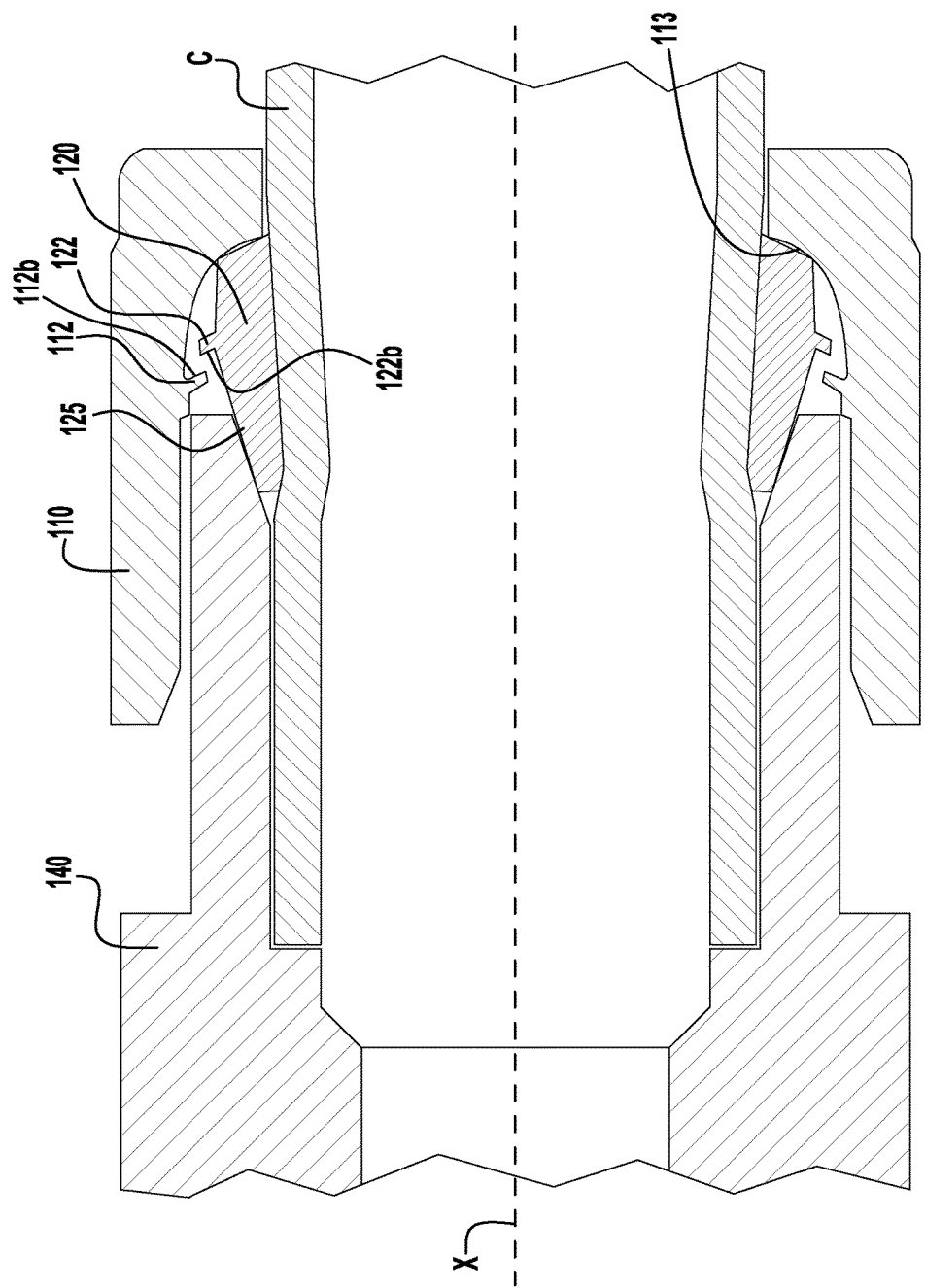

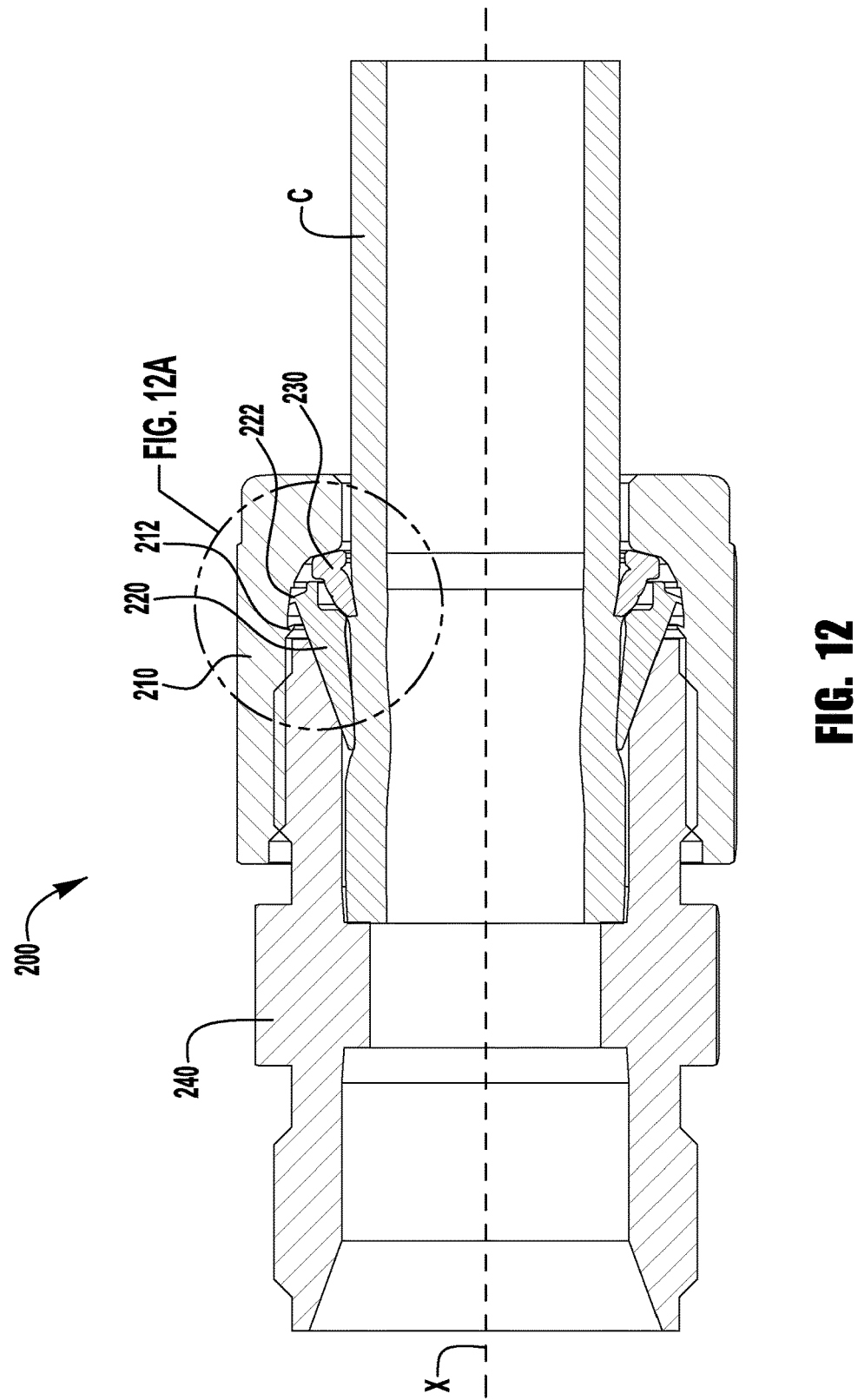

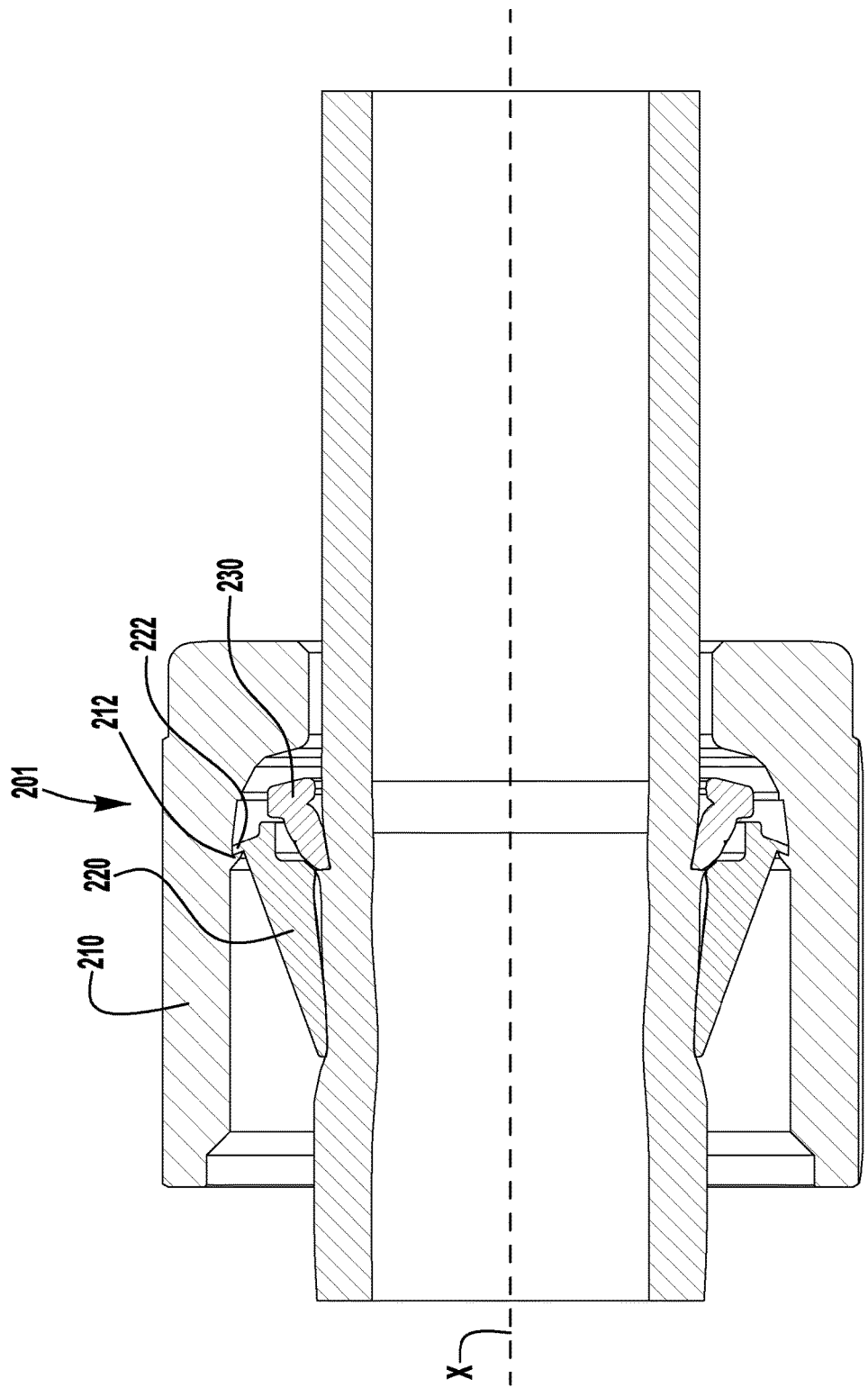

COMPONENT RETAINING STRUCTURE FOR CONDUIT FITTING

CROSS-REFERENCE TO RELATED APPLICATION

This application claims priority to and all benefit of U.S. Provisional Patent Application Ser. No. 62/210,146, filed on Aug. 26, 2015, for COMPONENT RETAINING STRUCTURE FOR CONDUIT FITTING, the entire disclosure of which is fully incorporated herein by reference.

TECHNICAL FIELD OF THE INVENTIONS

The present disclosure relates to fittings for making mechanically attached connections between a conduit and another fluid component, for containing liquid or gas fluids. More particularly, the disclosure relates to fittings for tube and pipe conduits that use one or more conduit gripping devices, such as for example, one or more ferrules.

SUMMARY OF THE DISCLOSURE

In accordance with an embodiment of one or more of the inventions presented in this disclosure, at least one conduit gripping device and a first coupling or fitting component are retained together as a discontinuous unit or cartridge prior to the unit being assembled with a second coupling or fitting component to form a complete fitting assembly. In an exemplary embodiment, a conduit fitting preassembly includes an annular fitting component and at least a first conduit gripping device. The annular fitting component has an interior wall extending axially from a forward end to a rearward end, and a first projection extending radially inward from the interior wall. The first conduit gripping device is received within the annular fitting component and includes a second projection extending radially outward of an outer surface of the first conduit gripping device. The first projection includes an outward tapered rear surface and the second projection includes an inward tapered front surface. The rear surface of the first projection is radially aligned with the front surface of the second projection, such that when the first conduit gripping device is in a forward-most position, the first projection interlocks with the second projection to prevent axial withdrawal of the first conduit gripping device from the annular fitting component.

In another exemplary embodiment, a preassembly for a conduit fitting includes a fitting nut having an interior wall extending axially from a forward end to a rearward end, and a first retaining feature, and front and rear ferrules received within the fitting nut. The front ferrule includes a second retaining feature extending radially outward of an outer surface of the front ferrule, a rear camming mouth, and an outboard axial projection extending rearward from a rear end portion of the front ferrule, entirely radially inward of the second projection, the outboard axial projection defining a rear bore extending axially rearward from the rear camming mouth. The rear ferrule is disposed between the front ferrule and a rear drive surface of the fitting nut, with an outer radial front end portion of the rear ferrule received in slip fit engagement within the rear bore of the front ferrule and a front camming surface of the rear ferrule, forward of the outer radial front end portion, engageable with the front ferrule camming mouth. The first retaining feature is radially aligned with and axially forward of the second retaining feature to impede axial withdrawal of the front ferrule from the fitting nut.

In another exemplary embodiment, a ferrule includes a body portion defining a tapered outer surface, a cylindrical interior wall, and a tapered interior camming mouth extending outward and rearward from the cylindrical interior wall, a retaining projection extending radially outward of a rearmost portion of the body portion, and an outboard axial projection extending axially rearward from the rearmost portion of the body portion, entirely radially inward of the retaining projection, the outboard axial projection defining an outwardly non-reducing rear bore extending axially rearward from the rear camming mouth.

In another exemplary embodiment, a fitting assembly includes first and second fitting components and at least a first conduit gripping device. The first fitting component has an interior wall extending axially from a forward end to a rearward end, and a first projection extending radially inward from the interior wall. The second fitting component assembles with the first fitting component to define an interior volume surrounded by the interior wall of the first fitting component. The first conduit gripping device is disposed within the interior volume and includes a second projection extending radially outward of an outer surface of the first conduit gripping device. The first projection is radially aligned with the second projection, such that when the first conduit gripping device is in a forward-most position with respect to the first fitting component, the first projection engages the second projection to block axial withdrawal of the first conduit gripping device from the annular first fitting component. When the first fitting component is pulled up with the second fitting component to a predetermined condition, the second projection engages a release assist surface of the first fitting component to deform the second projection out of radial alignment with the first projection to permit subsequent disassembly of the first fitting component from the first conduit gripping device.

In another exemplary embodiment, a fitting assembly includes first and second fitting components and at least a first conduit gripping device. The first fitting component has an interior wall extending axially from a forward end to a rearward end, and a first projection extending radially inward from the interior wall. The second fitting component assembles with the first fitting component to define an interior volume surrounded by the interior wall of the first fitting component. The first conduit gripping device is disposed within the interior volume and includes a second projection extending radially outward of an outer surface of the first conduit gripping device. The first projection is radially aligned with the second projection, such that when the first conduit gripping device is in a forward-most position with respect to the first fitting component, the first projection engages the second projection to block axial withdrawal of the first conduit gripping device from the annular fitting component. When the first fitting component is pulled up with the second fitting component, the second projection is modified to increase interengagement of the second projection with the first projection when the first conduit gripping device is in the forward-most position with respect to the first fitting component.

In another exemplary embodiment, a method is contemplated for assembling a fitting subassembly is including an annular fitting component having a first projection extending radially inward from the interior wall and at least a first conduit gripping device including a second projection extending radially outward of an outer surface of the first conduit gripping device. In the exemplary method, the second projection is radially aligned with the first projection. The second projection is axially forced against the first projection to radially deform at least one of the first and second projections out of radial alignment with the other of the first and second projections. The second projection is axially pressed past the first projection, wherein at least one of the radially deformed first and second projections elastically returns to radial alignment with the other of the first and second projections to retain the first conduit gripping device with the annular fitting component.

In another exemplary embodiment, a method of assembling a fitting is contemplated. In the exemplary method, a subassembly is provided, including an annular first fitting component having an interior wall extending axially from a forward end to a rearward end, and a first projection extending radially inward from the interior wall, and at least a first conduit gripping device received within the annular fitting component and including a second projection extending radially outward of an outer surface of the first conduit gripping device, wherein the first projection is radially aligned with the second projection to block axial withdrawal of the first conduit gripping device from the first fitting component. The first fitting component is assembled with a second fitting component on a conduit such that the first conduit gripping device grips against the conduit, and the second projection is modified to increase interengagement of the second projection with the first projection when the first conduit gripping device is in a forward-most position with respect to the first fitting component.

In another exemplary embodiment, a retaining fitting component includes a retaining member that is disposed in a recess in an interior wall of the retaining fitting component to retain at least one conduit gripping device with the retaining fitting component. The retaining member cooperates with an interior wall of the retaining fitting component to retain the conduit gripping device therewith. When the retaining fitting component is assembled with a mating fitting component, the mating fitting component moves the retaining member relative to the retaining fitting component to a recessed portion of the retaining fitting component to radially separate the retaining fitting member from an outer radial portion of the at least one conduit gripping device, to permit disassembly of the first fitting component from the at least one conduit gripping device. Prior to the retaining and mating fitting components being assembled together, the outer radial portion of the at least one conduit gripping device blocks movement of the retaining member into axial alignment with the recessed portion of the interior wall.

In accordance with another embodiment of one or more of the inventions presented in this disclosure, a cartridged fitting component and conduit gripping device may be retained together as a discontinuous unit or cartridge after being assembled with a second coupling or fitting component to form a complete fitting assembly, which that when the first fitting component of the assembled fitting is disassembled from the second fitting component, the conduit gripping device is retained with the first fitting component. In an exemplary embodiment, a preassembly for a conduit fitting includes an annular fitting component having an interior wall extending axially from a forward end to a rearward end, and a first projection extending radially inward from the interior wall, and at least a first conduit gripping device received within the annular fitting component and including a second projection extending radially outward of an outer surface of the first conduit gripping device. The first projection includes an outward tapered rear surface and the second projection includes an inward tapered front surface. The rear surface of the first projection is radially aligned with the front surface of the second projection, such that when the first conduit gripping device is in a forward-most position, the first projection interlocks with the second projection to prevent axial withdrawal of the first conduit gripping device from the annular fitting component.

In another exemplary embodiment, a fitting assembly includes an annular first fitting component, a second fitting component, and at least a first conduit gripping device. The first fitting component has an interior wall extending axially from a forward end to a rearward end and a first projection extending radially inward from the interior wall. The second fitting component assembles with the first fitting component to define an interior volume surrounded by the interior wall of the first fitting component. The first conduit gripping device is disposed within the interior volume and includes a second projection extending radially outward of an outer surface of the first conduit gripping device. The first projection is radially aligned with the second projection, such that when the first conduit gripping device is in a forward-most position with respect to the first fitting component, the first projection engages the second projection to block axial withdrawal of the first conduit gripping device from the annular fitting component. When the first fitting component is pulled up with the second fitting component, the second projection is modified to increase interengagement of the second projection with the first projection when the first conduit gripping device is in the forward-most position with respect to the first fitting component.

These and other aspects and advantages of the inventions described herein will be readily appreciated and understood by those skilled in the art in view of the accompanying drawings.

BRIEF DESCRIPTION OF THE DRAWINGS

FIG. 2 is a longitudinal cross-sectional view of a conduit fitting assembly using the subassembly of FIG. 1A, with the fitting assembly illustrated in a finger tight condition;

FIG. 8 is a longitudinal cross-sectional schematic view of a conduit fitting assembly using the subassembly of FIG. 7A, with the fitting assembly illustrated in a pulled-up condition;

FIG. 12 is a longitudinal cross-sectional view of the conduit fitting assembly of FIG. 10, shown in a pulled-up condition;

FIG. 13 is a longitudinal cross-sectional view of the fitting nut, ferrules and conduit of the pulled-up assembly of FIG. 12, shown disassembled from the fitting body;

DESCRIPTION OF THE EXEMPLARY EMBODIMENTS

Figure 1A:
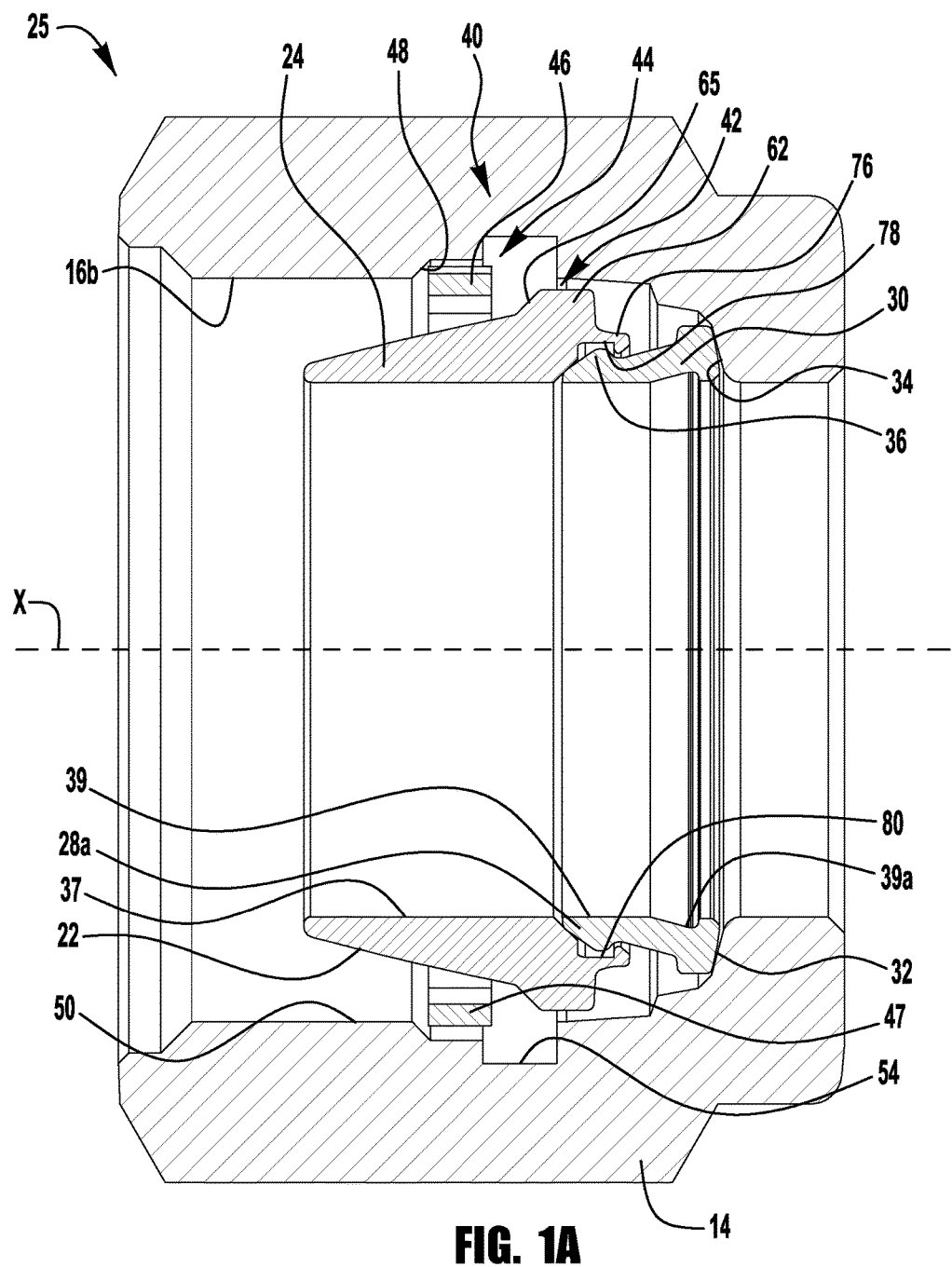
FIG. 1A is a longitudinal cross-sectional view of an exemplary conduit fitting cartridge, subassembly or preassembly illustrating exemplary features of one or more of the inventions herein, shown with the ferrules loosely disposed in an axially rearward position.

Although the exemplary embodiments herein are presented in the context of a stainless steel tube fitting, the inventions herein are not limited to such applications, and will find use with many different conduits such as tube and pipe as well as different materials other than 316 stainless steel, including metals and non-metals for either the conduit, the gripping devices or the fitting components or any combination thereof. The inventions may also be used for liquid or gas fluid systems. While the inventions herein are illustrated with respect to particular designs of the conduit gripping devices and fitting components, the inventions are not limited to use with such designs, and will find application in many different fitting designs that use one or more conduit gripping devices. We use the term "conventional" to refer to commercially available or later developed parts or parts that are otherwise commonly known, used or that those of ordinary skill in the art would be familiar with in general, as distinguished from parts that may be modified in accordance with teachings herein. We use the term "ferrule set" to refer to a combination of conduit gripping devices with or without other parts that form the means by which conduit grip and seal are achieved. Although not necessary with all fitting designs, it is common that a ferrule set comprises two ferrules that are purposely matched to each other and to the fitting components, for example, based on material, manufacturer, interrelated design and geometry features and so on. In some fittings, in addition to the conduit gripping devices there may be one or more additional parts, for example seals. Therefore, the term "ferrule set" may also include in some embodiments the combination of one or more conduit gripping devices with one or more other parts by which the ferrule set effects conduit grip and seal after a complete pull-up. The inventions may be used with tube or pipe, so we use the term "conduit" to include tube or pipe or both. We generally use the term "fitting assembly" or "fitting" interchangeably as a shorthand reference to an assembly of typically first and second fitting components along with one or more conduit gripping devices. The concept of a "fitting assembly" thus may include assembly of the parts onto a conduit, either in a finger-tight position, a partial pull-up position or complete pull-up position; but the term "fitting assembly" is also intended to include an assembly of parts together without a conduit, for example for shipping or handling, as well as the constituent parts themselves even if not assembled together.

The term "complete pull-up" and derivative forms as used herein refers to joining the fitting components together so as to cause the one or more conduit gripping devices to deform, usually but not necessarily plastically deform, to create a fluid tight seal and grip of the fitting assembly on the conduit. A "partial pull-up" and derivative terms as used herein refers to a partial but sufficient tightening of the male and female fitting components together so as to cause the conduit gripping device or devices to deform so as to be radially compressed against and thus attached to the conduit, but not necessarily having created a fluid tight connection or the required conduit grip that is achieved after a complete pull-up. The term "partial pull-up" thus may also be understood to include what is often referred to in the art as pre-swaging wherein a swaging tool is used to deform the ferrules onto the conduit sufficiently so that the ferrules and the nut are retained on the conduit prior to being mated with the second fitting component to form a complete fitting assembly. A finger tight position or condition refers to the fitting components and conduit gripping devices being loosely assembled onto the conduit but without any significant tightening of the male and female fitting components together, usually typified by the conduit gripping device or devices not undergoing plastic deformation.

Fittings typically include two fitting components that are joined together, and one or more gripping devices, however, the inventions herein may be used with fittings that include additional pieces and parts. For example, a union fitting may include a body and two nuts. We also use the term "fitting remake" and derivative terms herein to refer to a fitting assembly that has been at least once tightened or completely pulled-up, loosened, and then re-tightened to another completely pulled-up position. Remakes may be done with the same fitting assembly parts (e.g. nut, body, ferrules), for example, or may involve the replacement of one of more of the parts of the fitting assembly. Reference herein to "outboard" and "inboard" are for convenience and simply refer to whether a direction is towards the center of a fitting (inboard) or away from the center (outboard). In the drawings, various gaps and spaces between parts (for example, gaps between the ferrules and the conduit in a finger-tight position) may be somewhat exaggerated for clarity or due to scale of the drawings.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

A significant feature of some of the inventions herein is the provision of a retaining structure by which one or more conduit gripping devices are retained with a fitting component, also referred to herein as a retaining fitting component, prior to assembly of the fitting component with a mating fitting component. By "cartridge" we mean a group of parts retained together as a discontinuous unit, subassembly or preassembly. We therefore use the terms cartridge, unit, subassembly and preassembly synonymously herein in the context of a discontinuous structure. We also use the term "cartridge nut" or "conduit fitting cartridge" herein to refer to such a cartridge, unit or subassembly in which one or more conduit gripping devices are retained with a fitting component such as a female nut, for example. We also use the term "ferrule cartridge" or "conduit gripping device cartridge" to refer to a unit or subassembly made up of at least one ferrule or conduit gripping device with at least one other part held together as a discrete unit. In particular, a "ferrule cartridge" includes two or more ferrules held together as a discrete unit or subassembly, and may include additional parts, for example, seals. In the exemplary embodiments herein, the cartridge includes one or more ferrules retained with a fitting component, such as a female threaded nut. Therefore, the exemplary embodiments herein may be referred to as a cartridge nut design, however in alternative embodiments, a "cartridge nut" may include a male threaded cartridge nut design or a cartridge body design.

Figure 1B:
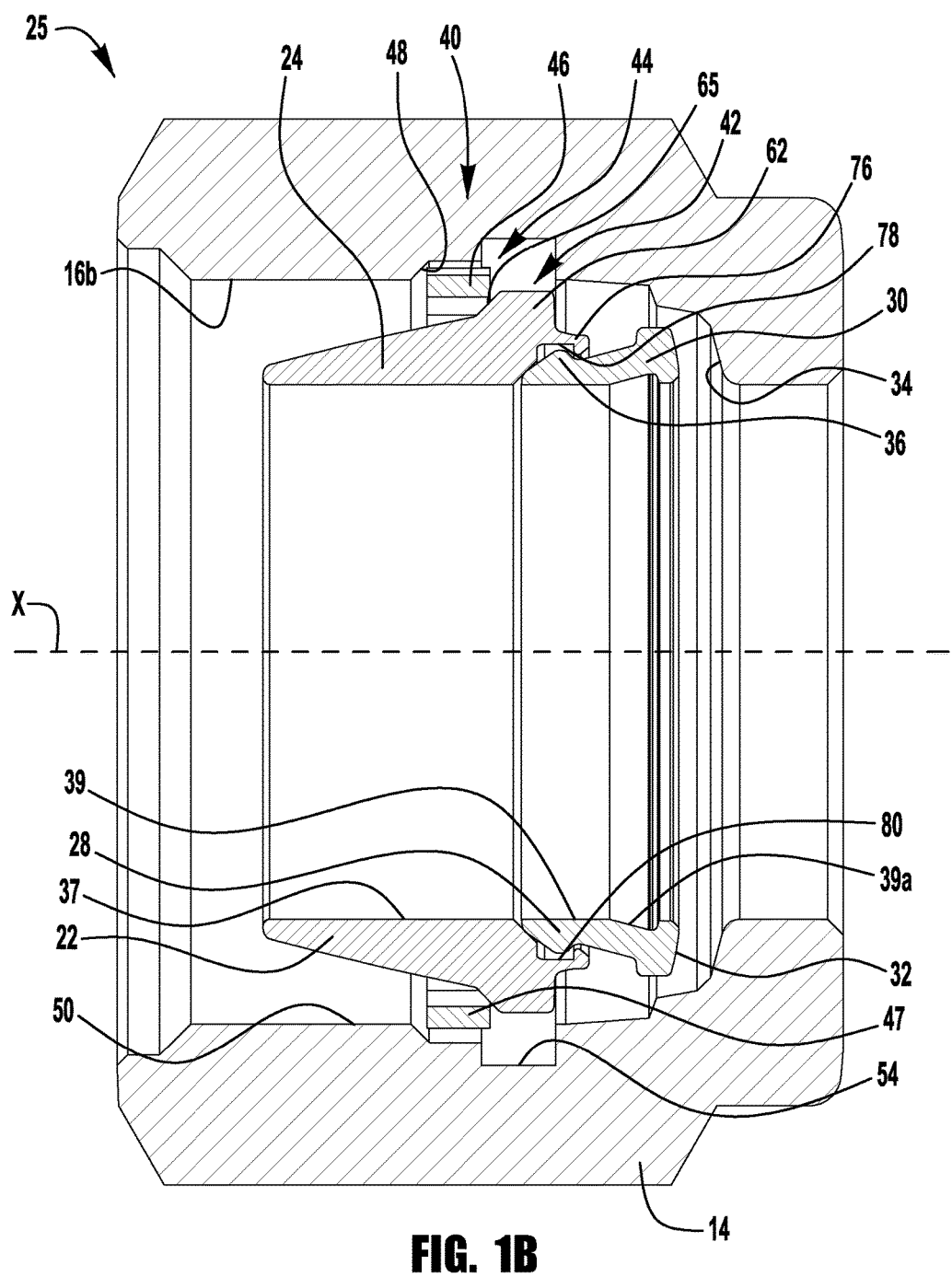
FIG. 1B is a longitudinal cross-sectional view of the conduit fitting cartridge of FIG. 1A, shown with the ferrules loosely disposed in an axially forward position.

We use the term "discontinuous" to describe the conjoined nature of the cartridge or preassembly in the sense that the one or more conduit gripping devices and the retaining fitting component, for example a female threaded nut in the FIGS. 1A and 1B embodiment, are manufactured as separate and discrete components and remain separate and discrete components, although in accordance with the inventions herein these components may be retained together as a discrete cartridge, subassembly or preassembly, and further wherein after final assembly or even a complete pull-up the parts remain discrete and may be disassembled into their constituent discrete parts if so desired. The terms "discontinuous" or "conjoined" are used herein to distinguish from fitting designs in which a conduit gripping device is attached to or made integral with a fitting component, wherein the conduit gripping device may remain integral or may in some designs break off or detach from the fitting component during complete or partial pull-up. In a discontinuous type structure, as that terminology is used in this disclosure, the one or more conduit gripping devices may optionally release or become separable from the retaining fitting component during either partial or complete pull-up without requiring a fracture, shear or other separation of material or adhesive. The terms "discontinuous" or "conjoined" are further intended to include broadly the idea that the one or more conduit gripping devices may be loosely or alternatively snugly retained with the retaining fitting component.

As one aspect of the present application, use of a discontinuous fitting component cartridge may facilitate providing ferrule sets to the end user in which the ferrules and nuts are properly oriented, matched, and assembled at the manufacturer. This can significantly simplify inventory control and reduce final assembly time. The embodiments herein also allow for a cartridge design in which the retaining fitting component may be used for fitting assemblies that do not need or have the retaining member. In other words, the cartridge designs herein use a nut or retaining fitting component that is backwards compatible with fitting assemblies that the end user may not require with a retaining structure. The cartridge design also may be realized using ferrule sets that do not require modification. Therefore, the cartridge concepts herein may be optionally provided for an end user without having to manufacture nuts or ferrules with different geometry and operation or performance. This allows the convenience of manufacturing and selling fitting components and ferrules as separate parts regardless of the end use of such individual parts, either for a cartridge use or a non-cartridge use.

As another aspect of the present application, a cartridge design with a female fitting component may include ferrules that are retained within the machined socket of the female fitting component (e.g., female nut), with the inboard end extending preferably but not necessarily axially past the front end of the front ferrule. The ferrules thus are somewhat shrouded and protected from possible damaging impacts against the ferrule surfaces.

With reference to FIGS. 1A-5, an exemplary embodiment of one or more of the inventions is presented. Note that in many of the drawings herein, for example FIGS. 3 and 4, the fittings are illustrated in half longitudinal cross-section, it being understood by those skilled in the art that the fitting components are in practice annular parts about a longitudinal centerline axis X. All references herein to "radial" and "axial" are referenced to the X axis except as otherwise noted. Also, all references herein to angles are referenced to the X axis except as may be otherwise noted.

In this disclosure unless otherwise noted, a fitting assembly 10 may include a first coupling or fitting component 12 and a second coupling or fitting component 14. These parts are commonly known in the art as a body and nut respectively, wherein the body 12 receives a conduit 18 end shown in phantom in FIG. 2, and the nut 14 may be joined to the body 12 during make up of the fitting. Although we use the common terms of body and nut herein as a convenience, those skilled in the art will appreciate that the inventions are not limited to applications wherein such terminology may be used to describe the parts. The body 12 may be a stand-alone component as illustrated or may be integral with or integrated or assembled into another component or assembly such as, for example, a valve, a tank or other flow device or fluid containment device. The body 12 may have many different configurations, for example, a union, a tee, or an elbow, to name a few that are well known in the art. Although the body 12 and nut 14 are illustrated as being threadably joined together by a threaded connection 16, threaded connections are not required in all uses. For example, some fittings have parts that are clamped together. Fittings are also commonly referred to in the art as male fittings or female fittings, with the distinction being that for a male fitting (FIGS. 2-5), the male body 12 includes an externally threaded portion 16a and the female nut 14 includes an internally threaded portion 16b. For a female fitting (not shown), the male nut includes an externally threaded portion and the female body includes an internally threaded portion. Many of the exemplary embodiments herein illustrate a male fitting assembly embodiment, for example, but the inventions herein also may be conveniently adapted for use with a female fitting assembly. When the fitting components, such as a body and nut for example, are joined they form a generally enclosed interior space or volume for the conduit gripping devices or other optional seal components.

The fitting assembly 10 may be used to form a fluid tight connection between an end portion 18a of a conduit 18 and the body 12 using one or more conduit gripping devices, which in the exemplary embodiments herein may be realized in the form of one or more ferrules. However, conduit gripping devices other than those that may be understood in the art as 'ferrules' may also be used with the inventions herein. The conduit end 18a typically bottoms against a radial shoulder 19 (FIG. 2) that is part of the body 12, as is well known. The body 12 includes a tapered camming surface 20 that engages a tapered front portion 22 of a first or front conduit gripping device or ferrule 24. The front ferrule 24 includes a tapered camming surface 26 (see FIG. 3) at its back end that engages a front portion 28 of a second or back conduit gripping device or ferrule 30. The rear ferrule 30 includes a driven surface 32 that engages a drive surface 34 of the female nut 14. The rear ferrule front portion 28 may optionally include a radially extending crown 36. The front and rear ferrules include cylindrical interior walls 37, 39 that are closely received over the outer surface 38 of the conduit 18. The rear ferrule may optionally include one or more radial recesses 39a. Although the exemplary embodiments herein illustrate fitting assemblies that use a conduit gripping device or ferrule set having two conduit gripping devices or ferrules, the inventions will readily find application to fittings that may use only a single conduit gripping device, as well as fittings that may use ferrule sets having more than two conduit gripping devices, or additional parts other than just ferrules or conduit gripping devices, for example, additional seals.

It is important to note that the exemplary geometric shapes, configurations and designs of the fitting coupling components 12, 14, and the conduit gripping devices 24, 30 are a matter of design choice and will depend in great measure on the materials used, and the design and performance criteria expected of the fitting. Many different coupling components and conduit gripping device designs are known in the art and may be designed in the future. The present disclosure and the inventions described herein and illustrated in the context of exemplary embodiments are directed to structure and method of retaining at least one conduit gripping device with one or a first of the fitting components as a discontinuous subassembly or cartridge which can thereafter be joined with another or second fitting component to form a fitting assembly.

FIG. 2 illustrates the fitting assembly 10 in a finger-tight condition, meaning that the various parts 12, 14, 24 and 30 have been assembled onto the conduit 18 (illustrated in phantom for clarity) but are loosely assembled or slightly tightened or snugged up by manually joining the nut 14 and body 12 together. Fittings are commonly pulled-up to a complete pulled-up position by counting complete and partial turns of the nut 14 relative to the body 12 from the finger-tight position. The present inventions, however, may be used with fitting designs that alternatively may be pulled-up by torque.

A retaining structure or mechanism (shown at reference 40 in FIG. 1) is provided for retaining the conduit gripping devices 24, 30 together with one of the fitting components 12, 14 as a discontinuous unit, cartridge, preassembly or subassembly 25 prior to connecting with the mating fitting component so as to install the conduit gripping devices onto the conduit 18. In an exemplary embodiment, the retaining structure 40 includes a first retaining portion 42 associated with the front ferrule 24, and a second retaining portion 44 associated with (e.g., assembled with) the female threaded nut 14.

In the exemplary embodiments herein, two conduit gripping devices may be retained with the female threaded nut 14 as a discontinuous cartridge 25, but alternative embodiments may be realized with a single conduit gripping device or more than two gripping devices, or with male threaded nuts, or any combination thereof. For the case of multiple conduit gripping devices or a ferrule set, we refer to the in-board conduit gripping device (for example, the front ferrule 24 in the embodiment of FIGS. 1-5) as the retaining conduit gripping device. Alternative embodiments however may utilize a retaining structure that cooperates with the rear ferrule 30 as the retaining conduit gripping device.

In many applications, it may be desirable after a partial or complete pull-up to be able to remove the retaining fitting component without disturbing the one or more conduit gripping devices. For example, after a fitting assembly 10 has been completely pulled up onto a conduit, the conduit gripping devices typically although not necessarily have been plastically deformed into a gripping engagement against the conduit 18 outer surface. It is not uncommon for assembled fittings to be later disassembled in order to allow maintenance and repair of one or more fluid components in a fluid system. After the repair or maintenance is completed the fitting is reassembled and retightened. This process is commonly referred to in the art as disassembly and remake. But in order to perform many repair and maintenance activities, the nut 14 often must be removed, or at least be slid axially back or away from the body 12 in order to allow the conduit to be withdrawn from the body 12. Typically, it will be desired to leave the one or more conduit gripping devices attached to the conduit, and even if that is not a desired outcome, it may often be desired to allow the nut to be pulled axially back away from the ferrules, which may not be possible unless the nut and ferrules have become released or separable from each other during pull-up. Therefore, it may be a desirable option that in such cases the nut and conduit gripping devices become separable during a partial or complete pull-up, at least to the extent that the ferrules and the retaining structure do not interfere with backing the retaining fitting component away from the mating fitting component and conduit gripping devices. The present inventions contemplate that the retained conduit gripping devices and the retaining fitting component, and particularly the retaining structure, initially assembled in the form of the discontinuous cartridge, can be separated or disengaged even after the conduit gripping devices have been fully installed on the conduit. In other words, the retaining structure 40 may be designed so as to decouple from the one or more conduit gripping devices after a partial or complete pull up of the fitting assembly onto the conduit. Examples of a variety of retaining structures that are releasable upon pull-up are described in co-owned U.S. Pat. No. 8,931,810 (the "'810 patent"), the entire disclosure of which is incorporated herein by reference.

The present application describes a fitting assembly including first and second fitting components, at least one conduit gripping device, and a retaining member assembled with the first fitting component to retain the at least one conduit gripping device with the first fitting component as a subassembly prior to the first and second fitting components being assembled together. When the first or retaining fitting component is assembled with the second or mating fitting component, the second fitting component engages the retaining member to axially move the retaining member into axial alignment with a recessed portion of an interior wall of the first fitting component, thereby allowing the retaining member to be received in the recessed portion. Prior to the first and second fitting components being assembled together, the outer radial portion of the at least one conduit gripping device blocks axial movement of the retaining member into axial alignment with the recessed portion of the interior wall.

In some embodiments (not shown), the front ferrule may be conventional in design, if so desired, so that the first retaining portion may simply be realized in the form of an outer radial portion of the outer tapered surface of the front ferrule. Alternatively, as shown in the illustrated embodiment, the front ferrule may be modified to include an additional structure or feature (e.g., one or more radially extending protrusions, such as, for example, a flange, lip, collar, rib, or boss) that defines the first retaining portion, for interaction with the retaining member 46. In any case, an outer radial portion of the front ferrule 24 will coact with the retaining member 46 so as to retain the ferrule or ferrule set together with the nut 14 as a discrete and discontinuous subassembly 25.

In the illustrated embodiment, the front ferrule 24 includes a back-end flange 62 that defines the outer radial portion of the ferrule. This flange 62 includes a radially outward extending wall portion 65 that abuts the retaining member 46 when the front ferrule is in an axially forward or inboard position so as to hold the ferrules 24, 30 and the nut 14 together as a discontinuous cartridge 25. The flange 62 also may be axially dimensioned (e.g., disposed at an axial location and/or provided with a sufficient axial length) so as to prevent a portion of the front ferrule 24 from falling into the recess 54 (described in greater detail below).

In the illustrated embodiment, the retaining member is disposed in a first axial position or retaining position in the pre-assembled stand alone cartridge 25, and may remain in the retaining position when the cartridge 25 is joined with the mating fitting component in the finger tight position. As a result of, for example, a partial or complete pull-up, the retaining member 46 is moved to a second axial position or release position. In this exemplary embodiment, the retaining member 46 moves axially and radially relative to the retaining fitting component to the release or disengage position of FIG. 3, as understood in comparing FIG. 3 with the retaining position of FIG. 2. The retaining structure 40 preferably is designed so as to not interfere with normal operation and pull-up of the conduit gripping devices onto the conduit to effect grip and seal, or with remakes of the fitting.

The retaining member 46 may be any generally annular or ring-like structure or partial ring-like structure that extends or protrudes generally radially inward such that a portion 47 of the retaining member radially aligns with an outer radial portion of the conduit gripping devices (e.g., a back flange 62 of the front ferrule 24, as described above) to prevent or inhibit the ferrules 24, 30 from falling out of the retaining fitting component 14. Although the retaining member 46 illustrated herein has a rectangular cross-section and extended axial length, the retaining member 46 may alternatively have a rounded, curved or sloped contour (e.g., at a distal portion 47) or other shape so as to not scratch or dig into the front ferrule. Additionally or alternatively, the retaining member may be provided in a softer or more flexible material to reduce or prevent marring of the ferrule. In still other embodiments, the retaining member may additionally or alternatively be shaped to reduce surface contact between the retaining member and the ferrule (e.g., by limiting surface contact to discrete locations around the circumference of the ferrule).

To accommodate the front ferrule 24 and the retaining member 46 within the nut, the outer radial surface of the front ferrule may be shaped to provide radial clearance for the retaining member 46. To provide this radial clearance, the tapered front surface 22 of the front ferrule may be convex or frustoelliptical in shape (as compared to a straight frustoconical taper), thereby providing additional radial clearance between a middle portion of the front ferrule and an inner surface of the fitting nut. An example of a convex or frustoelliptical front ferrule is shown and described in greater detail in co-pending U.S. patent application Ser. No. 14/707,306, filed on May 8, 2015, the entire disclosure of which is incorporated by reference. In other embodiments, the front ferrule may be provided with an outer circumferential groove or recess that provides radial clearance for the retaining member, examples of which are shown and described in the above incorporated '810 patent.

The retaining member 46 is movable between a retaining position and a release or disengage position. In the retaining position the conduit gripping devices and the retaining fitting component form the discontinuous cartridge 25. In the release position, the retaining fitting component is separable from the conduit gripping devices. Preferably, the retaining member is in the release position after a partial or complete pull-up but not in an initial finger-tight position. For example, the release position may be selected to coincide with a partial pull-up that is sufficient to cause the conduit gripping devices to begin plastically defaulting the conduit, such that subsequent loosening or separation of the retaining fitting component from the mating fitting component permits the released conduit gripping devices to maintain gripping engagement with the deformed conduit surfaces. The exemplary retaining member 46 is movable relative to the retaining fitting component 14 so as to have a first axial position at which the retaining member 46 interferes with the retaining conduit gripping device (the front ferrule 24 in the illustrated embodiment), and a second axial position at which the retaining member 46 does not adversely interfere with the retaining conduit gripping device.

By "does not adversely interfere," it is meant that the retaining member no longer significantly resists separation of the retaining fitting component and the one or more conduit gripping devices, and also does not present an obstruction or otherwise affect operation of the conduit gripping devices during pull up, or with remakes. But, the retaining member may, but does not have to, contact or engage the retaining fitting component in the release position. The designer may determine the degree of resistance or interference, if any, that the retaining member presents to separation of the retaining fitting component from the fitting assembly after a complete or partial pull-up. This feature of a second position in which the retaining member 46 does not adversely interfere with the retaining conduit gripping device may optionally also be utilized in other of the embodiments described herein.

In the exemplary embodiment, the retaining member 46 exhibits a first radial position and a second radial position at the first and second axial positions, respectively. In the first radial position, at least a portion of the retaining member radially aligns with the outer portion of the retaining conduit gripping device to retain the conduit gripping devices within the retaining fitting component. In the second radial position, the innermost radial portion of the retaining member 46 is disposed radially outward of the outer portion of the retaining conduit gripping device to no longer adversely interfere with the retaining conduit gripping device.

The exemplary retaining fitting component or nut 14 also includes a recessed portion or pocket 54, formed in an interior surface of the nut that axially locates the release or second axial position of the retaining member 46. The recessed portion 54 may be axially adjacent the first axial position of the retaining member, or may be further axially spaced therefrom as needed. The exemplary recessed portion has a greater radial dimension than the portion of the nut in which the retaining member is disposed in the first axial position, so that the retaining member 46 is restricted to the first radial position when in the first axial position, and can expand radially outwardly to the second radial position when aligned with the recessed portion in the second axial position. The second radial recess 54 thus axially locates the release position. The radial depth of the second radial recess 54 may be chosen so that when the retaining member 46 is located therein, the retaining member no longer adversely interferes with the conduit gripping devices 24, 30.

The second axial position of the retaining member (e.g., as determined by an axial location of the recessed portion 54 of the nut 14) may be chosen in concert with the amount of relative axial displacement of the nut 14 and the body 12 to determine at what point during pull-up the retaining member 46 is transposed to the release position by being moved into the recessed portion 54. For example, it may be desired in some embodiments to have the retaining member 46 be displaced to the release position upon completion of a pull-up operation, prior to completion of a pull-up operation, upon completion of a pre-swage operation, or upon tightening to a partial pull-up condition that is sufficient to cause the conduit gripping devices to begin plastically deforming the conduit, such that subsequent loosening or separation of the retaining fitting component from the mating fitting component permits the released conduit gripping devices to maintain gripping engagement with the deformed conduit surfaces.

In one embodiment, the retaining member may be radially compressed or otherwise radially outwardly biased, such that when the retaining member is axially aligned with a recessed portion or pocket of the retaining fitting component in the second axial position, the retaining member automatically snaps, springs, or expands outward to the second radial or release position, received within the recessed portion of the retaining fitting component. In this release position, the retaining member 46 will no longer adversely interfere with the retaining front ferrule 24, thus allowing, if so desired, for the nut 14 to be axially backed away or loosened from the body 12 even if the ferrules 24, 30 remain attached to the conduit 18. In an exemplary embodiment, the retaining member 46 may be realized in the form of a snap ring or other ring like member. The ring may be continuous or split and need not be round or of any particular shape.

For embodiments that use a retaining member 46 in the form of a compressed ring, it will be appreciated that in many uses the ring may likely be highly compressed while in the cartridge subassembly as well as in the finger-tight position. This compression may be used to assure a robust subassembly that does not come apart too easily (as determined by the designer) during handling and shipping. It can therefore be expected that when the retaining member shifts into the release position, that the retaining member 46 may snap out into the second recess 54 with sufficient impact as to produce an audible "click". This audible feedback may alert the assembler directly that the retaining member has released, or sensors may be used (such as, for example, recorders, transmitters and light indicators) to indicate sufficient pull-up to the release position.

In cases where the retaining member is a shaped ring (as in FIGS. 6A and 6B hereinbelow), having a hoop strength or outward radial bias against the retaining member 46 may be beneficial in keeping the retaining member centered. The optional use of a radial outward load or hoop stress on the retaining member 46 will be determined by the type of materials used and the design of the retaining member, as well as the robustness desired for the discontinuous cartridge.

Figure 6B:
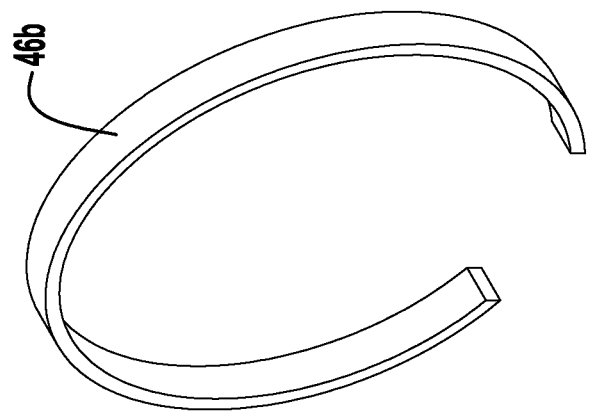
FIGS. 6A and 6B illustrate perspective views of two examples of a retaining ring that may be used in the fitting assembly of FIG. 2.
Figure 6A:
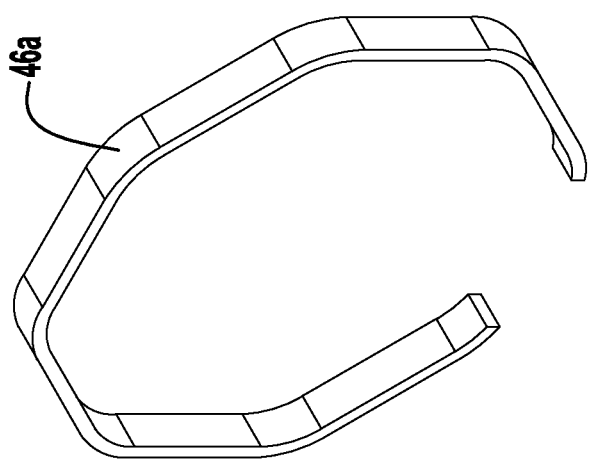

FIGS. 6A and 6B illustrate two examples of a retaining ring 46*a*, 46*b*. In both cases the retaining ring 46*a*, 46*b* may be a split ring as shown, but continuous rings may alternatively be used. The split ring configuration allows for increased control of the radial flexibility of the ring. The FIG. 6A embodiment is octagonal shaped, although other polygonal shapes or non-polygonal shapes may be used, and the FIG. 6B embodiment is a simple circular shape. The polygonal shape or other non-circular profile may be used to allow the ring to be compressed small enough to be inserted into the nut (e.g., past the threads) yet expand out large enough to snap out into recessed portion (e.g., into contact with the inner surface of the recessed portion) of the nut for release of the ferrules. The polygonal shape may reduce the stress in the fully compressed state such that the ring does not plastically deform or take a permanent set. Non-circular ring shapes may additionally or alternatively be selected to reduce the number of direct contact locations or points 49a between the retaining ring 46a and the front ferrule 24. This may reduce the amount of friction between the ring and the nut inner diameter during axial movement of the ring. Moreover, a non-circular profile such as illustrated in FIG. 6A facilitates use of a retaining ring 46a that may optionally contact the inner surface of the recess 54 at discrete locations to help center the ring 46a, while at the same time providing a number of direct contact locations for retaining the ferrules.

The retaining member 46 may be made of any suitable material, including elastomer, plastic and metal and preferably sturdy enough to retain the ferrules with the nut 14 as a cartridge 25. Use of a metal retaining member 46 allows for all metal fitting assemblies for high temperature applications or use with fluids that may damage an elastomer or plastic. Suitable metals may include but are not limited to stainless steel, brass, copper, steel and so on to name just a few of the many available materials.

In still other embodiments, the retaining member may be movable from a first radial position to a second radial position at the second axial position, for example, by engagement of the retaining member with a ramped outer surface of the retaining conduit gripping device. In such an embodiment (not shown), the retaining member may be plastically deformable to remain in the second radial position, or the retaining member may be otherwise held in the second radial position (e.g., by a tight or interference fit of the retaining member within the recessed portion of the retaining fitting component).

The design of the retaining fitting component may depend in part on how robust a connection is desired between the retaining fitting component and the conduit gripping devices, in other words, the nature of the retention force desired. For example, in some applications it may be desired to have the ferrules 24, 30 strongly and securely retained with the fitting component 14 so that the ferrules do not fall out or get knocked out during handling, shipping or exposure to other force applying environments. In the illustrated example, the retaining fitting component or nut 14 has a shallow inboard recess or pocket 48 formed in an interior surface of the nut 14 that receives the retaining member 46 and axially locates the retaining position. The inboard recess 48 may be formed in the interior cylindrical wall 50 of the nut 14. After the ferrule set 24, 30 has been inserted into the nut 14, the retaining member 46 is inserted so as to snap into the inboard recess 48. The radial depth of the first recess 48 along with the dimensions of the retaining member 46 may be selected so that the retaining member 46 interferes with and inhibits the ferrule set (ferrules 24, 30) from falling out of the nut 14. The outward spring bias of the retaining member 46 along with a backing shoulder 52 may be used to help keep the retaining member 46 in the inboard recess 48. Additionally (not shown), a ramped seating shoulder may be provided rearward of the backing shoulder to seat the retaining member in the first axial position until the retaining member is moved by the mating fitting component toward the second axial position. This seated condition of the retaining member may allow for a predetermined amount of axial movement of the ferrules within the cartridge preassembly prior to fitting assembly.

Figure 3:
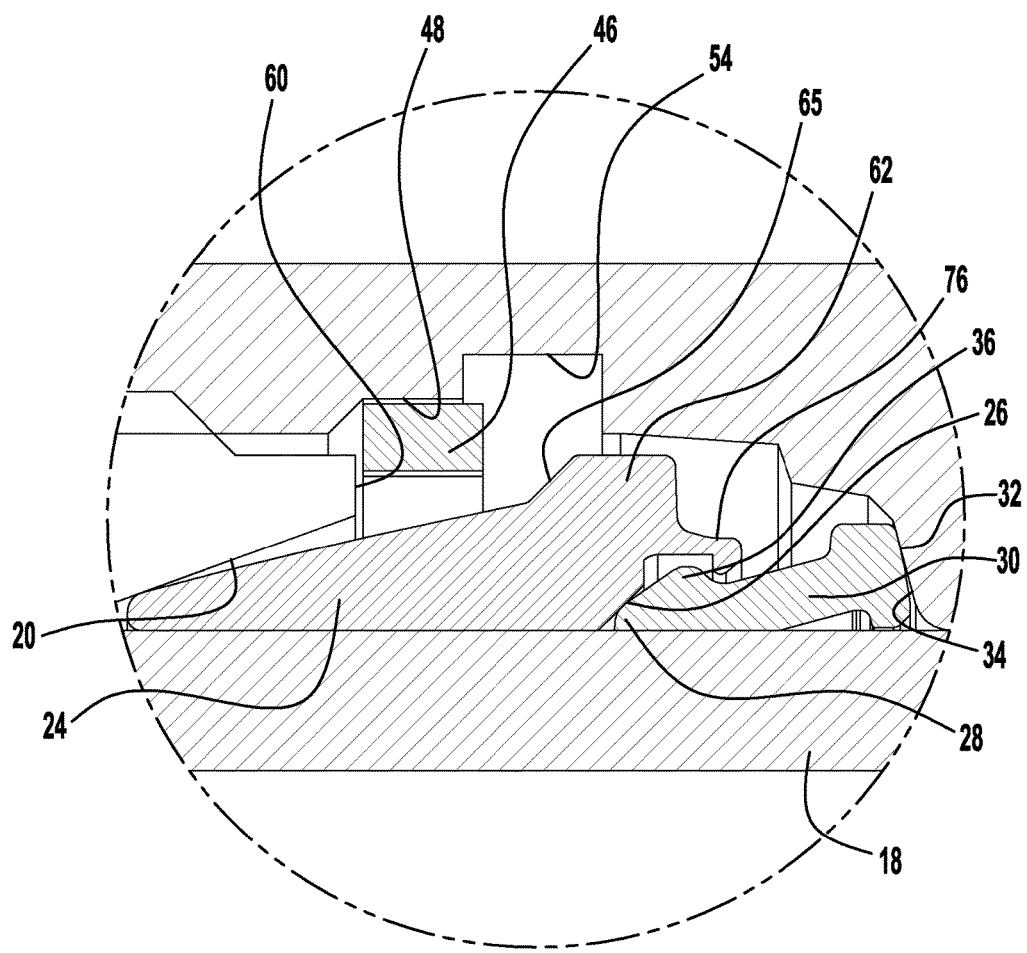
FIG. 3 is an enlarged view of the circled region of the conduit fitting assembly of FIG. 2.
Figure 4:
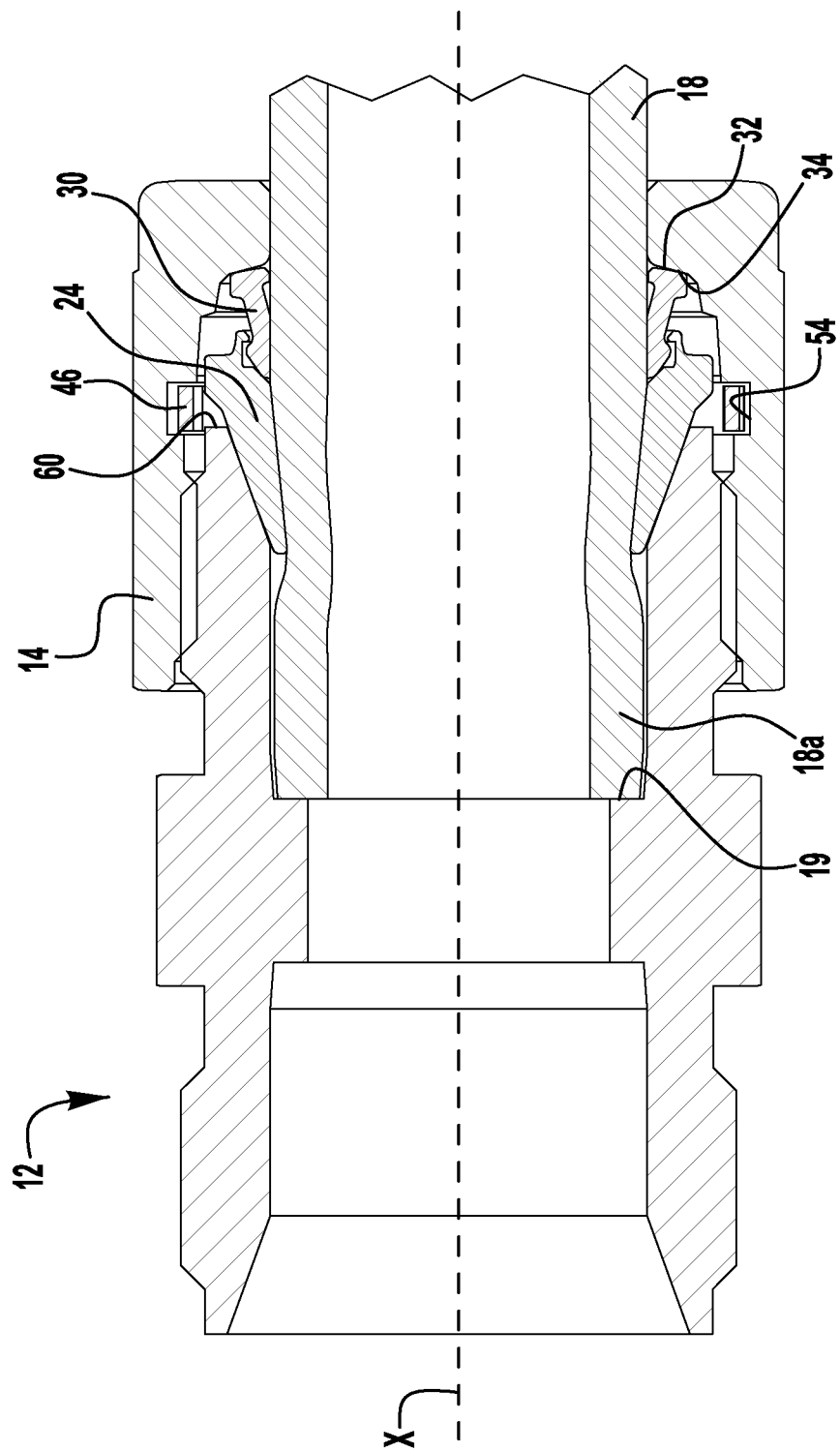
FIG. 4 is a longitudinal cross-sectional view of the conduit fitting assembly of FIG. 2, shown in a partially pulled-up condition.
Figure 5:
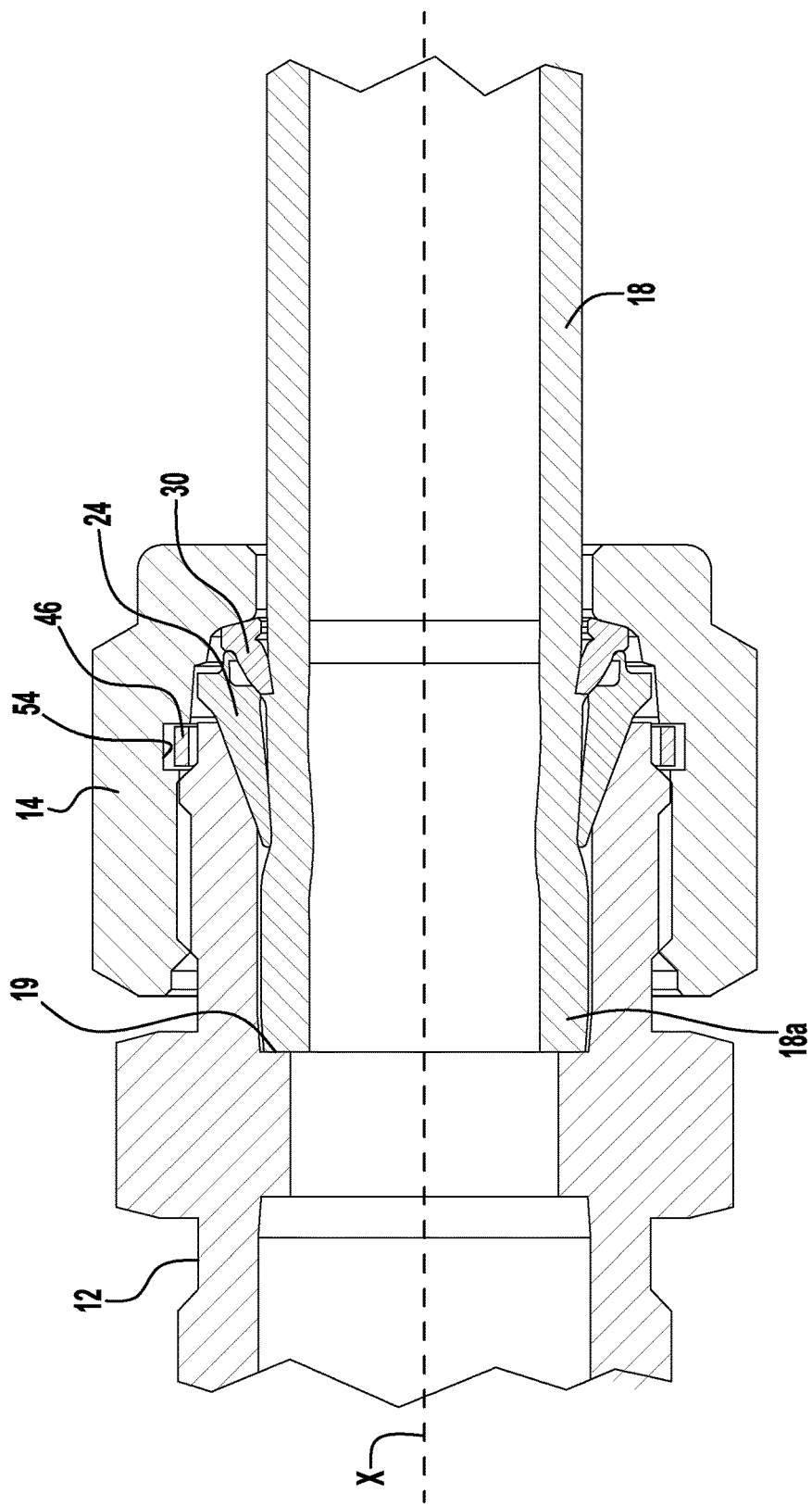
FIG. 5 is a longitudinal cross-sectional view of the conduit fitting assembly of FIG. 2, shown in a pulled-up condition.

Further, to prevent the retaining member from being bumped, jostled, or otherwise prematurely forced into the ferrule releasing recess 54, the ferrules may be arranged such that prior to deformation of the ferrules associated with a pull-up of the fitting (e.g., a full or partial pull-up of the fitting), the ferrules block movement of the retaining member into axial alignment with the recess. For example, as shown in the finger-tight assembly of FIG. 2, the back flange 62 of the un-deformed front ferrule 24 blocks axial movement of the retaining member 46 into alignment with the recess 54, thereby preventing premature release of the ferrules from the nut 14. When the fitting is partially pulled up by a sufficient amount, as shown in FIG. 3, the front and rear ferrules are deformed such that the back flange of the front ferrule is axially and/or radially displaced from the recessed portion 54, thereby permitting movement of the retaining member into axial alignment with the recessed portion 54.

In other applications, such a strong retention force may not be needed. In these embodiments, the inboard recess and backing shoulder may be omitted. In some such embodiments, the radially outward biasing forces of the retaining member against the inner surface of the nut may be sufficient to resist ejection of the retaining member from the inboard end of the nut, for example, if the nut is dropped or jostled during shipment.

As another example, in some applications it may be desired to have the ferrules snugly held together and retained with the fitting component. In such an embodiment, the retaining member may be axially located (e.g., by an inboard recess or pocket, as described above) to snugly or even tightly contact the conduit gripping devices between an outboard surface of the retaining member and a drive surface of the fitting nut. In other applications, it may be more desirable to have the ferrules somewhat loosely held together and retained with the fitting component, and may even have a slight rattle when the nut 14 is gently shaken. This looseness may in some applications facilitate final assembly with the second or mating fitting component (in this example the body 12), especially in allowing the ferrules to center and align during pull-up of the fitting assembly 10 without interfering with centering of the ferrules as the nut is initially rotated relative to the body, and without inhibiting tube insertion or providing a false indication of tube bottoming in the fitting.

As used herein, loose or loosely held cartridged components may be considered to include components that are axially moveable within the cartridging component such that they may be positioned at a location that is free of contact from surfaces defining the limits of axial movement, as discussed in greater detail below. This range of axial movement may be minimal (e.g., 0.002 inches). Loose or loosely held cartridged components may also be considered to include components that are radially movable within the cartridging component such that they may be positioned at a location that is free of contact from surfaces defining the limits of radial movement. This range of radial movement may be minimal (e.g., sufficient to permit rotation and/or resistance-free axial movement of the cartridged component). Snugly held cartridged components may be considered to include components that are not axially and/or radially moveable within the cartridging component, such that axial and/or rotational movement of the cartridged components is resisted by contact with surfaces restricting axial and/or radial movement. Tightly held cartridged components may be considered to include components that are forced into contact with surfaces restricting axial and/or radial movement, such that at least some deformation (e.g., plastic and/or elastic deformation) of these contacting surfaces has occurred.

In the illustrated embodiment, the retaining member 46 of the cartridge assembly 25 is axially positioned such that the conduit gripping devices 24, 30 are axially movable within the cartridge assembly 25 between a rearward position (FIG. 1A) in which a rear surface of the conduit gripping devices (e.g., driven surface 32 of rear ferrule 30) engages a driving surface 34 of the nut 14, and a forward position (FIG. 1B) in which the back flange 62 of the front ferrule 24 engages the outboard or distal surface 47 of the retaining member 46. Additionally, the inboard recess may optionally be provided with a ramped shoulder separating the inboard recess from the ferrule releasing recess, to seat the retaining member in the first axial or retaining position and to resist rearward movement of the retaining member prior to fitting pull-up, thereby maintaining a loose condition of the ferrules in the cartridge assembly.

The first axial position of the retaining member (e.g., as determined by the axial location of a backing shoulder 52, as described above) may be chosen to determine the amount of axial movement of the ferrules that will be permitted within the cartridge subassembly. For example, if the backing shoulder 52 is positioned such that an outboard or rearward end of the retaining member contacts the outer portion of the front ferrule and the drive surface of the rear ferrule contacts the driving surface of the nut, the resulting first axial position of the retaining member will tightly retain the ferrules within the cartridge. If the backing shoulder 52 is positioned further inboard or forward of this position, a desired amount of axial movement of the ferrules may be permitted.

While many different mechanisms may be utilized to cause the mating fitting component to axially advance the retaining member when the fitting is pulled up, in an exemplary embodiment, a portion of the mating fitting component engages the retaining member to axially move the retaining member toward the release position. In one such embodiment, the mating fitting component includes a radially extending drive surface (e.g., an end face of the mating fitting component) that directly engages the retaining member to axially move the retaining member when the retaining fitting component is assembled with the mating fitting component.

In the illustrated example, the body 12 includes an axially outboard end face 60 that engages the retaining member 46 after some predetermined axial displacement of the nut 14 relative to the body 12. Further tightening of the nut 14 onto the body 12 causes the outboard end 60 to push against the retaining member 46, and in this embodiment, push or displace the retaining member 46 axially relative to the nut 14 towards and into axial alignment with the radial recess 54 of the nut 14. Typically, fittings are pulled-up by holding the body 12 rotationally fixed and using a wrench to rotate the nut 14 relative to the body 12. This causes an axial advance of the nut onto the body. But this relative axial advance of the nut and body together may also be effected by holding the nut and body and rotating the body or rotating both the nut and the body. Therefore, for purposes of this disclosure we consider the "movement" of the retaining member from the retaining position to the release position as being a relative movement between the retaining member 46 and the nut 14. This can be viewed as the body end 60 "pushing" on the retaining member 46, or simply abutting the retaining member 46 as the nut advances. Regardless of how the nut and body are tightened together, the retaining member 46 will exhibit an axial and/or radial displacement relative to the retaining fitting component so as to "move" from the retaining position to the release position.

In an exemplary method of assembling a fitting, a subassembly is provided with a first fitting component, at least one conduit gripping device, and a retaining member assembled with the first fitting component to retain the at least one conduit gripping device with the first fitting component. The first fitting component is assembled with a second fitting component, such that the second fitting component axially moves the retaining member into axial alignment with a recessed portion of an interior wall of the first fitting component, thereby allowing the retaining member to be received in the recessed portion and radially separate from an outer radial portion of the at least one conduit gripping device, to permit disassembly of the first fitting component from the at least one conduit gripping device. Prior to the first and second fitting components being assembled together, the outer radial portion of the at least one conduit gripping device blocks axial movement of the retaining member into axial alignment with the recessed portion of the interior wall of the first fitting component.

In the illustrated embodiment, the front and rear ferrules 24, 30 form a ferrule cartridge 70, with the front and rear ferrules being connected together as a discrete subassembly or cartridge before the ferrules are assemble with the retaining nut 14. The front ferrule 24 may include a retaining structure 76 in the form of an extension or tang 78 that provides a socket or recess 80. The rear ferrule front portion 28 may be snapped into this recess 80 so as to connect the ferrules together as a ferrule cartridge. Note from the pulled-up position in FIG. 5, the ferrule cartridge retaining structure 40 has released the rear ferrule 24 from the front ferrule 30. The ferrule cartridge design, along with other ferrule cartridge designs that may additionally or alternatively be utilized with the exemplary fittings described herein, is fully described in pending United States patent application serial no. PCT/US2009/67508 filed on Dec. 10, 2009 for FERRULE ASSEMBLY FOR CONDUIT FITTING (the "'508 Application"), the entire disclosure of which is incorporated herein by reference. In exemplary embodiments of the present application that utilize a retaining structure by which the fitting nut directly retains the front ferrule, since the rear ferrule is captured between the front ferrule and the drive surface of the fitting nut, a cartridging connection between the front and rear ferrules may be unnecessary once the front ferrule has been cartridged with the nut. In such embodiments, suitable non-cartridging front and rear ferrules may be preferred.

In other embodiments, according to another aspect of the present application, a fitting nut (or other fitting component) and conduit gripping device may include retaining features that are deformable during cartridging for interlocking engagement to retain the conduit gripping device with the retaining fitting component. Similar to the exemplary embodiments shown in FIGS. 1A-5 and described above, and the embodiments of the above incorporated '810 patent, these deformable retaining features may be movable to a release or disengage position upon pull-up (e.g., full or partial pull-up, or a subsequent re-make) to permit disengagement or separation of the ferrules from the nut. In other embodiments, the deformable retaining features may permanently or non-separably retain the at least one conduit gripping device with the fitting component, even after the fitting is pulled up and/or after the nut (or other fitting component) is loosened or disassembled from a fitting body (or other fitting component). This permanently cartridged subassembly may prevent improper reassembly of the conduit gripping devices within the fitting and/or loss of or damage to the conduit gripping devices upon fitting disassembly.

Figure 7:
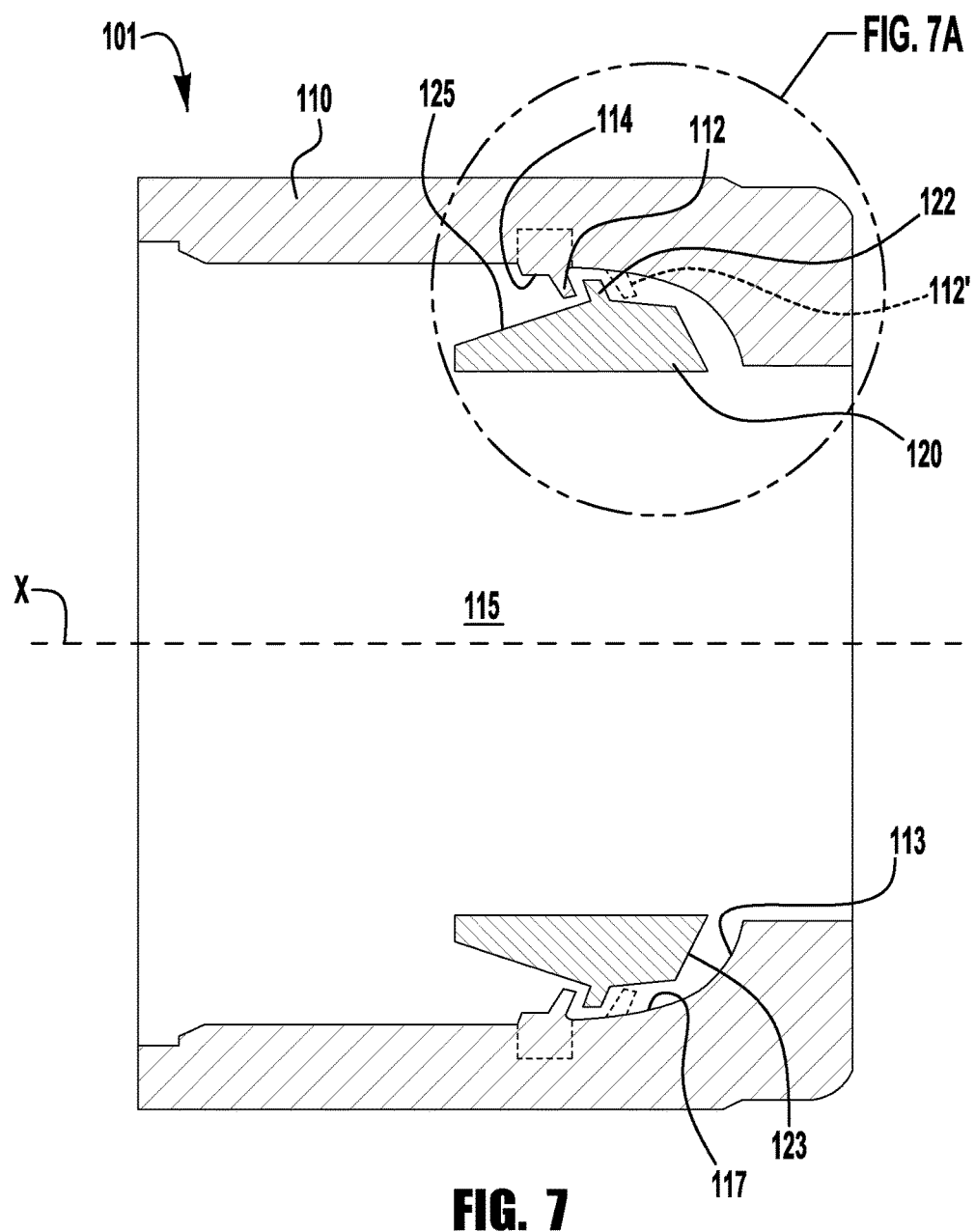
FIG. 7 is a longitudinal cross-sectional schematic view of an exemplary conduit fitting cartridge, subassembly or preassembly illustrating exemplary features of one or more of the inventions herein.
Figure 7A:
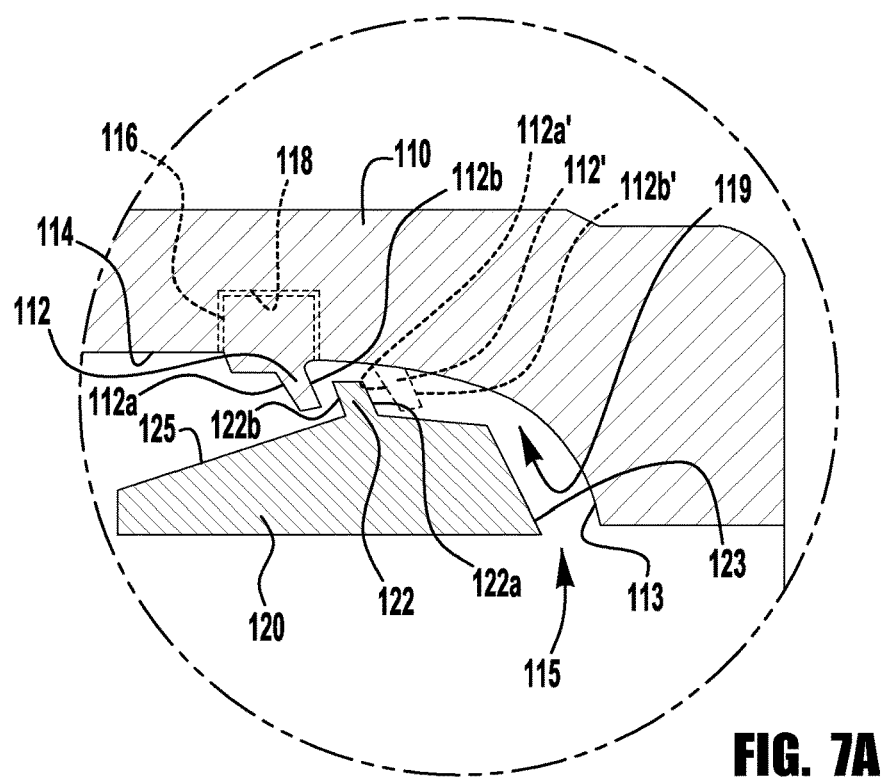
FIG. 7A is an enlarged partial cross-sectional schematic view of the conduit fitting cartridge of FIG. 7.
Figure 7B:
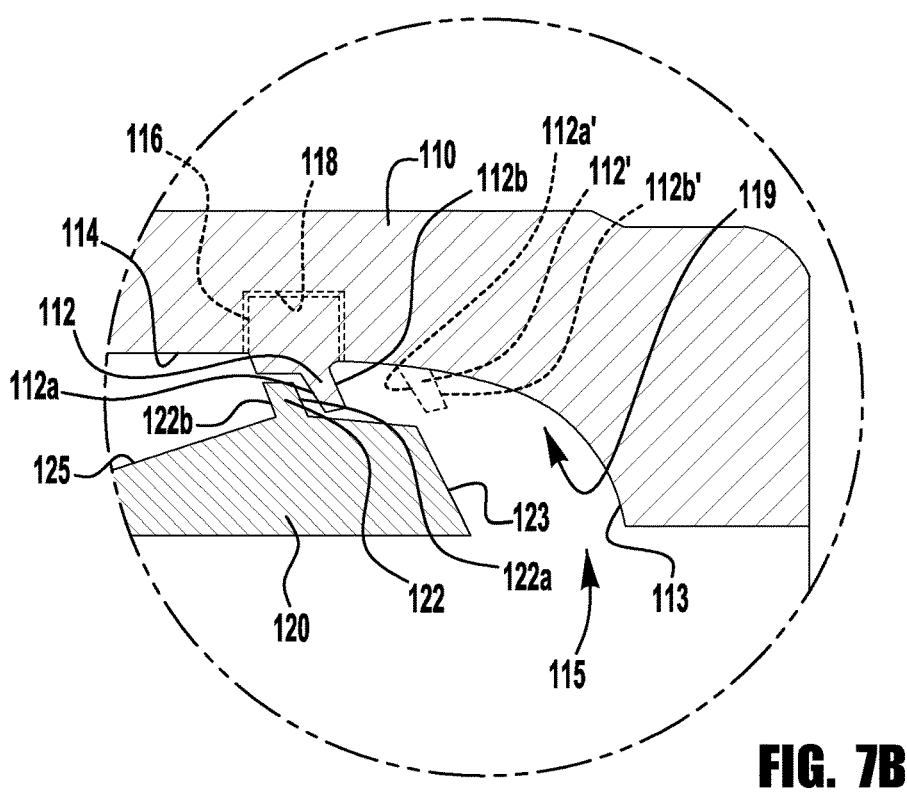
FIG. 7B is an enlarged partial cross-sectional schematic view of the conduit fitting cartridge of FIG. 7, shown with the conduit gripping device in a pre-installed position

Many different retaining arrangements may be utilized to permanently or releasably retain one or more conduit gripping members with a fitting component. For example, as schematically shown in FIGS. 7, 7A, and 7B, a cartridge subassembly 101 for a fitting (see FIG. 8) may include a retaining fitting component 110 (e.g., a fitting nut) provided with at least a first projection 112 extending radially inward from an interior wall 114 of the retaining fitting component, and a conduit gripping device 120 (e.g., a single ferrule, as schematically shown, or a front ferrule of a twin ferrule arrangement) retained within an interior cavity 115 of the retaining fitting component 110 and provided with at least a second projection 122 extending radially outward of an outer surface 125 of the conduit gripping device 120. The projection 122 may, but need not, extend directly from the outer surface 125. The first projection 112 may be a continuous annular projection (e.g., a flange or ridge) extending from the interior wall 114 of the retaining fitting component, or may alternatively be one of one or more segmented or discontinuous projections (e.g., ribs or tabs) extending from the interior wall. Similarly, the second projection 122 may be a continuous annular projection (e.g., a flange or ridge) extending from the outer surface 125 of the conduit gripping device, or may alternatively be one of one or more segmented or discontinuous projections (e.g., ribs or tabs) extending from the outer surface. The first and second projections 112, 122 are radially aligned such that the second projection 122 engages the first projection 112 when the conduit gripping device 120 is in a forward-most position within the retaining fitting component, thereby preventing axial withdrawal of the conduit gripping device 120 from the retaining fitting component 110.

When the retaining fitting component 110 has been pulled up with a second fitting component 140 (e.g., a fitting body) on a conduit C, as shown in FIG. 8, the first and second projections may remain radially aligned to prevent subsequent disassembly of the retaining fitting component from the conduit gripping devices when the retaining fitting component 110 is loosened or disassembled from the second fitting component 140. Alternatively, either or both of the first and second projections may be further deformed upon pull-up (e.g., initial pull-up or subsequent re-make) to radially separate the first projection from the second projection, to allow for subsequent disassembly of the retaining fitting component from the conduit gripping devices when the retaining fitting component is loosened or disassembled from the second fitting component. For example, as shown in FIG. 7, an interior surface 117 of the retaining fitting component 110, rearward of the first projection 112, may be contoured and positioned to function as a release assist feature to allow for subsequent disassembly of the retaining fitting component from the conduit gripping devices when the retaining fitting component is loosened or disassembled from the second fitting component. During pull-up or re-make of the fitting, this release assist surface 117 imparts a radial compressive force against the second projection 122 to radially separate the second projection from the first projection 112 at a predetermined axial advance of the conduit gripping device with respect to the retaining fitting component, for example, to correspond with a partial pull-up, full initial pull-up, or re-make of the fitting, thereby allowing for subsequent disassembly of the retaining fitting component from the one or more conduit gripping devices. The release assist surface 117 may include, for example, one or more of a tapered surface, a curved surface, a stepped surface, and a radially inward projection, which may, but need not, be annular or circumferentially continuous.

To permit preassembly of a retaining fitting component and conduit gripping device having interengaging projections, as described above, in one embodiment, the first projection 112 of the retaining fitting component 110 may be disposed on a retaining member insert (shown in phantom at 116 in FIGS. 7A and 7B) that is assembled with the retaining fitting component 110 (e.g., snapped into an annular recess 118 in the interior wall 114) after the conduit gripping device 120 has been installed in the interior cavity 115 of the retaining fitting component 110. In another embodiment, one or both of the first and second projections 112, 122 may be elastically radially deformable (e.g., bendable or compressible) such that during installation of the conduit gripping device 120 into the retaining fitting component 110, the second projection 122 of the conduit gripping device 120 may be pressed past the first projection 112 of the retaining fitting component 110 and into an interior recess 119 of the retaining fitting component, recessed from and rearward of the first projection 112. The elastically deformed projection or projections then snap back (at least partially) into radial alignment for cartridged retention of the conduit gripping device 120 in the interior cavity 115 of the retaining fitting component 110. As used herein, elastic deformation may include any defoamation that is at least partially elastic, and may therefore include deformation that is partially elastic and partially plastic.

To facilitate elastic radial deformation of either or both of the first and second projections 112, 122, one or both of the first and second projections may be provided with tapered camming surfaces 112a, 122a, adapted to engage the other of the first and second projections during preassembly to impart radial compression forces on the other of the first and second projections when an axial installation force is applied to the conduit gripping device. In the illustrated embodiment, the first projection 112 is provided with an inward tapered front camming surface 112a that engages a rear camming surface 122a of the second projection 122 during installation of the conduit gripping device 120 in the retaining fitting component 110, to elastically bend the second projection radially inward.

To facilitate retaining interengagement of the first and second projections 112, 122 after installation of the conduit gripping device 120 in the retaining fitting component 110, the projections may be provided with tapered interengaging surfaces 112b, 122b that interlock or hook together when a forward axial force is applied to the installed conduit gripping device 120 or when a rearward axial force is applied to the retaining fitting component 110. In the illustrated embodiment, an outward tapered rear interengaging surface 112b of the first projection 112 is shaped to interlock with an inward tapered front interengaging surface 122b of the second projection 122. This hooked or interlocking engagement serves to prevent or reduce radial deformation of the projections 112, 122 from this forward axial force, and reinforces retention of the conduit gripping device against shock, vibration, or forces applied to the fitting during disassembly.

The tapered interengaging surfaces 112b, 122b of the first and second projections 112, 122 may be machined, extruded, molded, or otherwise formed in this tapered orientation during manufacturing of the retaining fitting component 110 and conduit gripping device 120. In other embodiments, plastic deformation (e.g., bending or compressing) of either or both of the first and second projections during installation of the conduit gripping device in the retaining fitting component may cause the interengaging surfaces to assume a tapered orientation, or to assume a steeper or more acute tapered orientation (for example, to promote an enhanced or strengthened interlocking engagement of the projections). As used herein, plastic deformation may include any deformation that is at least partially plastic, and may therefore include deformation that is partially plastic and partially elastic.

Figure 7C:
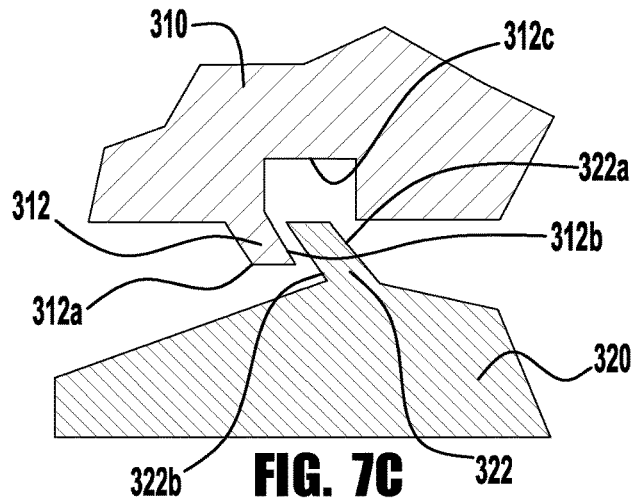
FIG. 7C is an enlarged partial cross-sectional schematic view of another conduit fitting cartridging arrangement of one or more of the inventions herein.
Figure 7D:
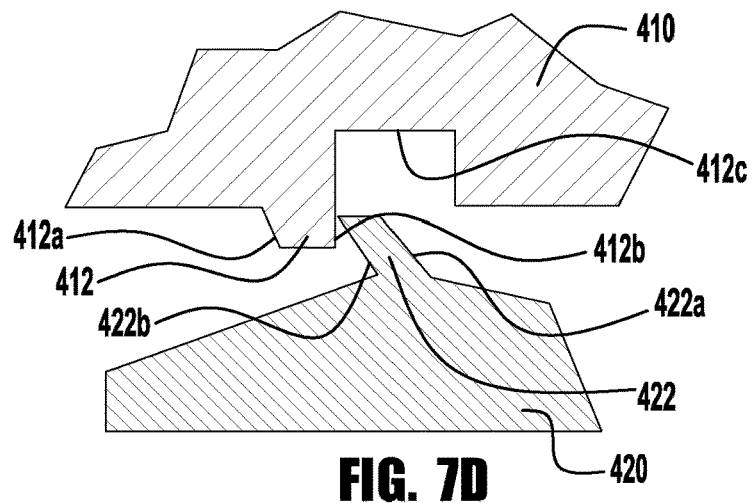
FIG. 7D is an enlarged partial cross-sectional schematic view of another conduit fitting cartridging arrangement of one or more of the inventions herein
Figure 7E:
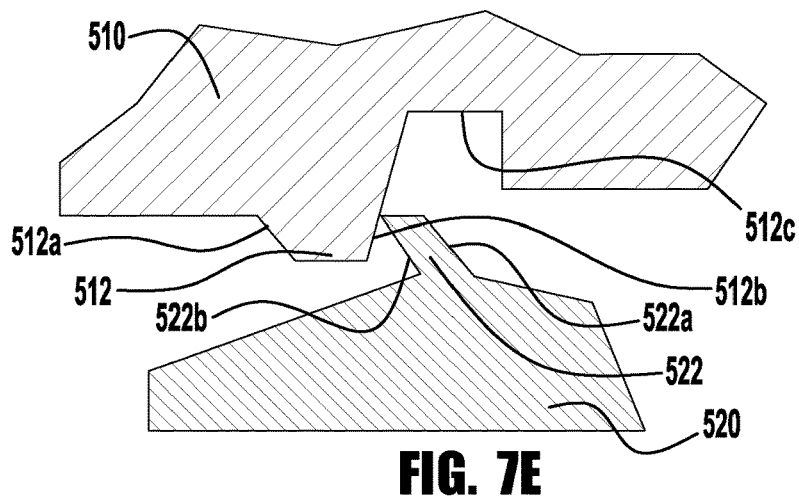
FIG. 7E is an enlarged partial cross-sectional schematic view of another conduit fitting cartridging arrangement of one or more of the inventions herein.

To further facilitate or strengthen retaining interengagement of the first and second projections after cartridging of the conduit gripping device in the retaining fitting component, the retaining fitting component may be provided with a recess (e.g., an annular recess) rearward of the first projection. In some embodiments, this may allow for elastic radial expansion of the second projection of the conduit gripping device into the recess when the second projection has been axially pressed past the first projection of the retaining fitting component during preassembly or cartridging of the conduit gripping device in the retaining fitting component. Additionally or alternatively, in other embodiments, the second projection of the conduit gripping device may be configured such that when a forward axial force is applied to the retained conduit gripping device, the second projection of the conduit gripping device is permitted to deform radially outward, in response to axial engagement with the first projection, such that an outer radial end portion of the second projection is received in the recess to further interlock the conduit gripping device with the retaining fitting component. FIG. 7C schematically illustrates an exemplary embodiment in which a retaining fitting component 310 is provided with an annular recess 312c rearward of a first projection 312. When the second projection 322 of the conduit gripping device 320 has been axially pressed past the first projection 312 of the retaining fitting component 310 during installation or cartridging of the conduit gripping device, the second projection may elastically expand or snap radially outward into the recess 312c for strengthened retaining interengagement. Additionally or alternatively, when a forward axial force is applied to the retained conduit gripping device 320, the second projection 322 of the conduit gripping device is permitted to deform or pivot axially rearward and radially outward, in response to axial engagement of the inward tapered front interengaging surface 322b of the second projection 322 with the outward tapered rear interengaging surface 312b of the first projection 312, such that an outer radial end portion of the second projection is received (or more deeply received) in the recess 312c to further interlock the conduit gripping device with the retaining fitting component. The use of an interlocking recess may also allow for enhanced interlocking engagement with a retaining fitting component projection 412 having a substantially radial (non-tapered) rear interengaging surface 412b (as shown in FIG. 7D) or a retaining fitting component projection 512 having an inward tapered rear interengaging surface 512b (as shown in FIG. 7E).

In some applications it may be desired to have the conduit gripping device(s) snugly held and retained with the fitting component. In such an embodiment, the first projection may be axially located to snugly or even tightly retain the conduit gripping device(s) between an outboard or rear surface of the retaining projection and a drive surface of the fitting nut. In other applications, it may be more desirable to have the conduit gripping device(s) somewhat loosely held together and retained with the fitting component, and may even have a slight rattle when the fitting component is gently shaken. This looseness may in some applications facilitate final assembly with the second or mating fitting component, especially in allowing the conduit gripping device(s) to center and align during pull-up of the fitting assembly without interfering with centering of the conduit gripping device(s) as the retaining fitting component is initially tightened or pulled-up on the second fitting component. In the illustrated embodiment, the retaining projection 112 of the retaining fitting component 110 is axially positioned such that the conduit gripping device(s) 120 are axially movable within the retaining fitting component between a rearward position in which a rear surface 123 of the conduit gripping device(s) (e.g., a driven surface of a rear ferrule) engages a drive surface 113 of the retaining fitting component 110 and a forward position in which the second projection 122 of the conduit gripping device(s) engages the first projection 112 of the retaining fitting component.

In another embodiment, a retaining fitting component 110 may be provided with a forward projection 112 that the conduit gripping device 120 is pressed past during preassembly of the cartridge subassembly to more loosely retain the conduit gripping device(s) in the retaining fitting component, and a rearward projection (shown in phantom at 112' in FIGS. 7A and 7B) that the conduit gripping device is pressed past during pull-up (e.g., to a partially or fully pulled up condition) to more snugly retain the conduit gripping device(s) in the retaining fitting component. In such an embodiment, the forward projection 112 may be less robust (e.g., shorter, thinner, like a detent) to sufficiently retain the conduit gripping device when the cartridge subassembly is dropped or shaken, and the rearward projection 112' may be more robust (e.g., longer, thicker, and/or oriented at a steeper acute angle) to more strongly and tightly retain the conduit gripping device against axial forces applied during disassembly of the retaining fitting component 110 from the second fitting component 140. Like the forward projection 112, the rearward projection 112' may be provided with tapered camming (front) and interengaging (rear) surfaces 112a', 112b' to facilitate advancement and retention of the conduit gripping device, as discussed above.

FIGS. 9-13 illustrate components and arrangements of an exemplary cartridge subassembly 201 and fitting assembly 200 including a retaining fitting nut 210 provided with an first annular flange 212 extending radially inward from an interior wall 214 of the nut, and front and rear ferrules 220, 230 retained within an interior cavity 215 of the nut 210. The front ferrule 220 is provided with a second annular flange 222 extending radially outward of an outer surface 225 of the front ferrule, at a rear end portion of the front ferrule. The flange 222 may, but need not, extend directly from the outer surface 225. The first and second flanges 212, 222 are radially aligned such that the second flange 222 engages the first flange 212 when the front ferrule 220 is in a forward-most position within the nut 210, thereby preventing axial withdrawal of the ferrules 220, 230 from the nut 210.

Figure 12A:
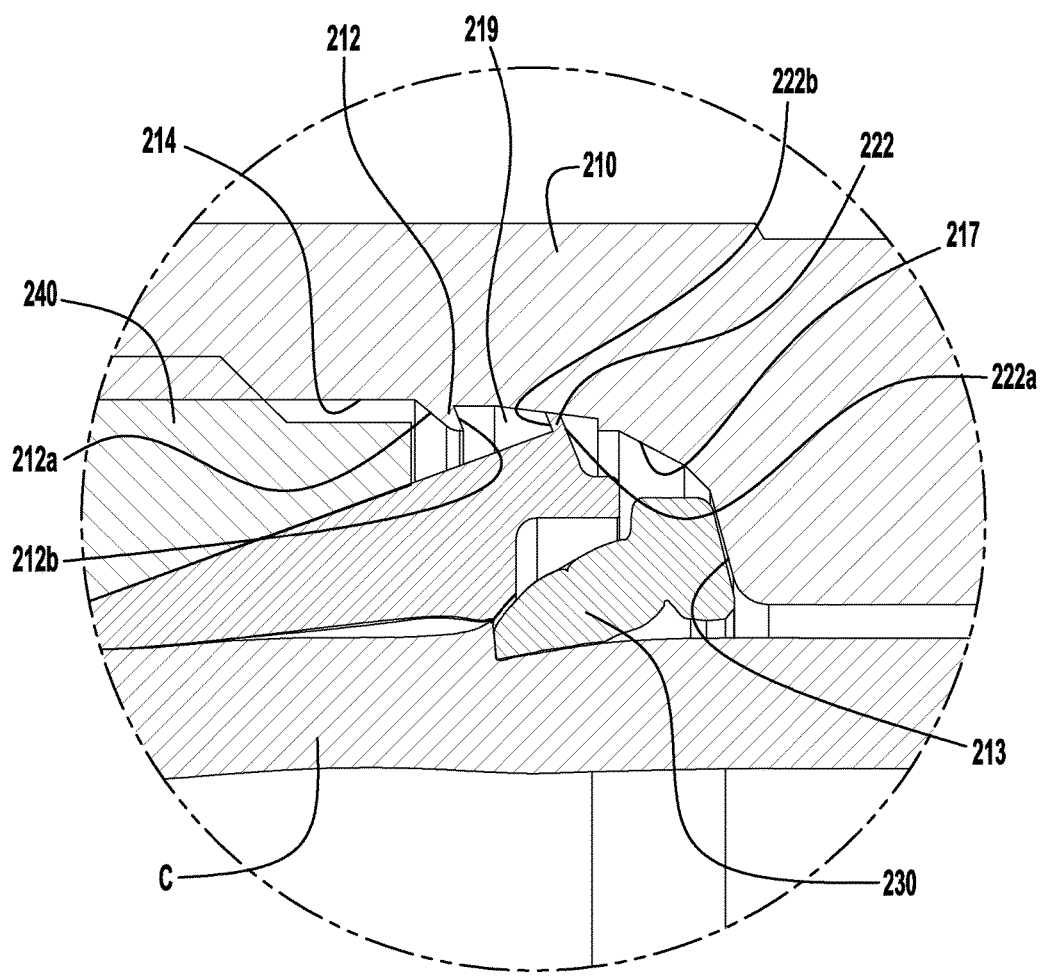
FIG. 12A is an enlarged longitudinal cross-sectional partial view of the pulled-up conduit fitting assembly of FIG. 12.

When the nut has been pulled up with a fitting body 240 on a conduit C, as shown in FIG. 12, the first and second flanges 212, 222 may remain radially aligned to prevent subsequent disassembly of the fitting nut 210 from the ferrules 220, 230 when the fitting nut 210 is loosened or disassembled from the fitting body 240. Alternatively, as discussed in greater detail below, either or both of the first and second projections may be further deformed upon pull-up (e.g., partial or complete initial pull-up or subsequent re-make) to radially separate the first projection from the second projection, to allow for subsequent disassembly of the retaining fitting component from the conduit gripping devices when the retaining fitting component is loosened or disassembled from the second fitting component.

Figure 10:
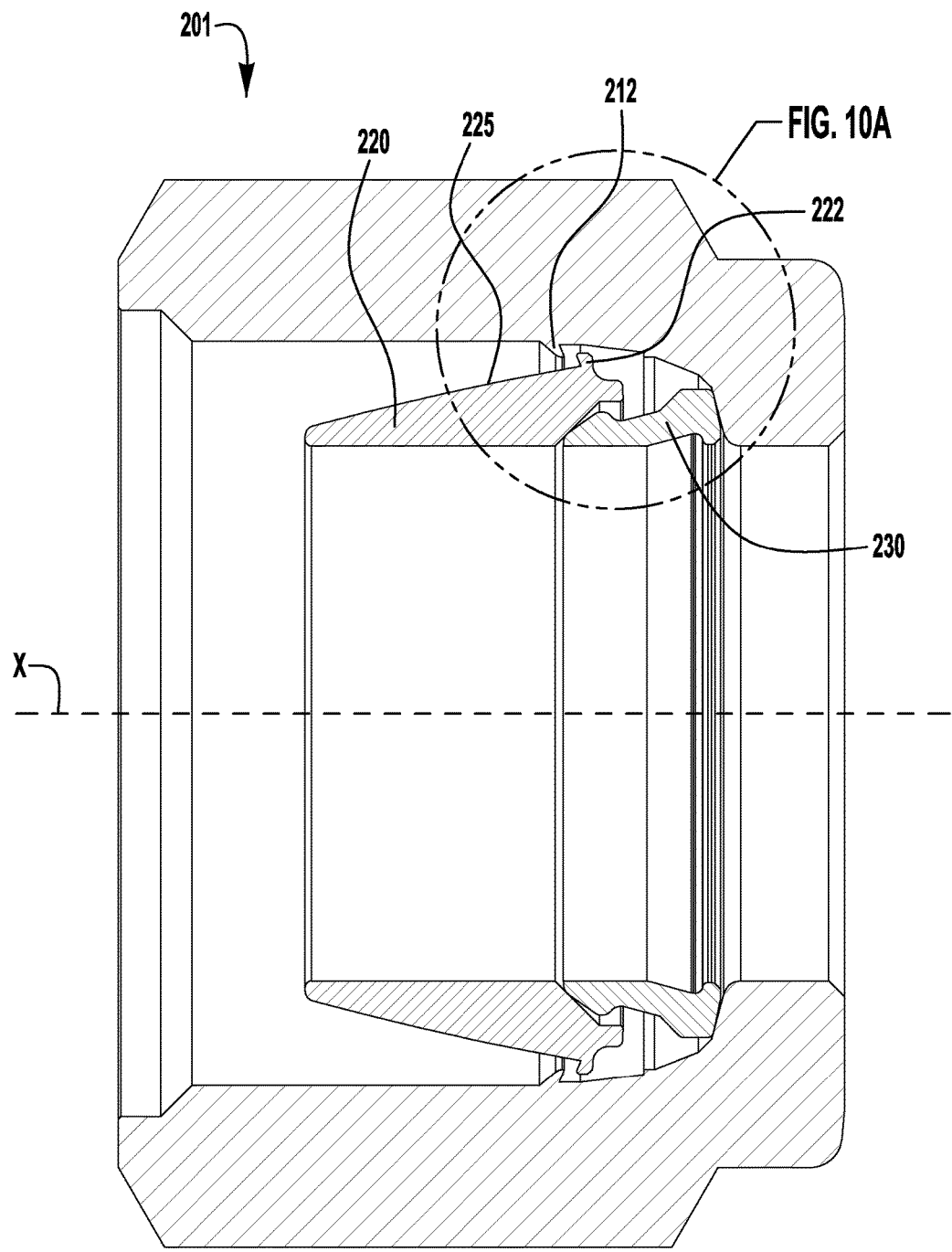
FIG. 10 is a longitudinal cross-sectional view of an exemplary subassembly or preassembly of the fitting nut and ferrules of FIG. 9.
Figure 10A:
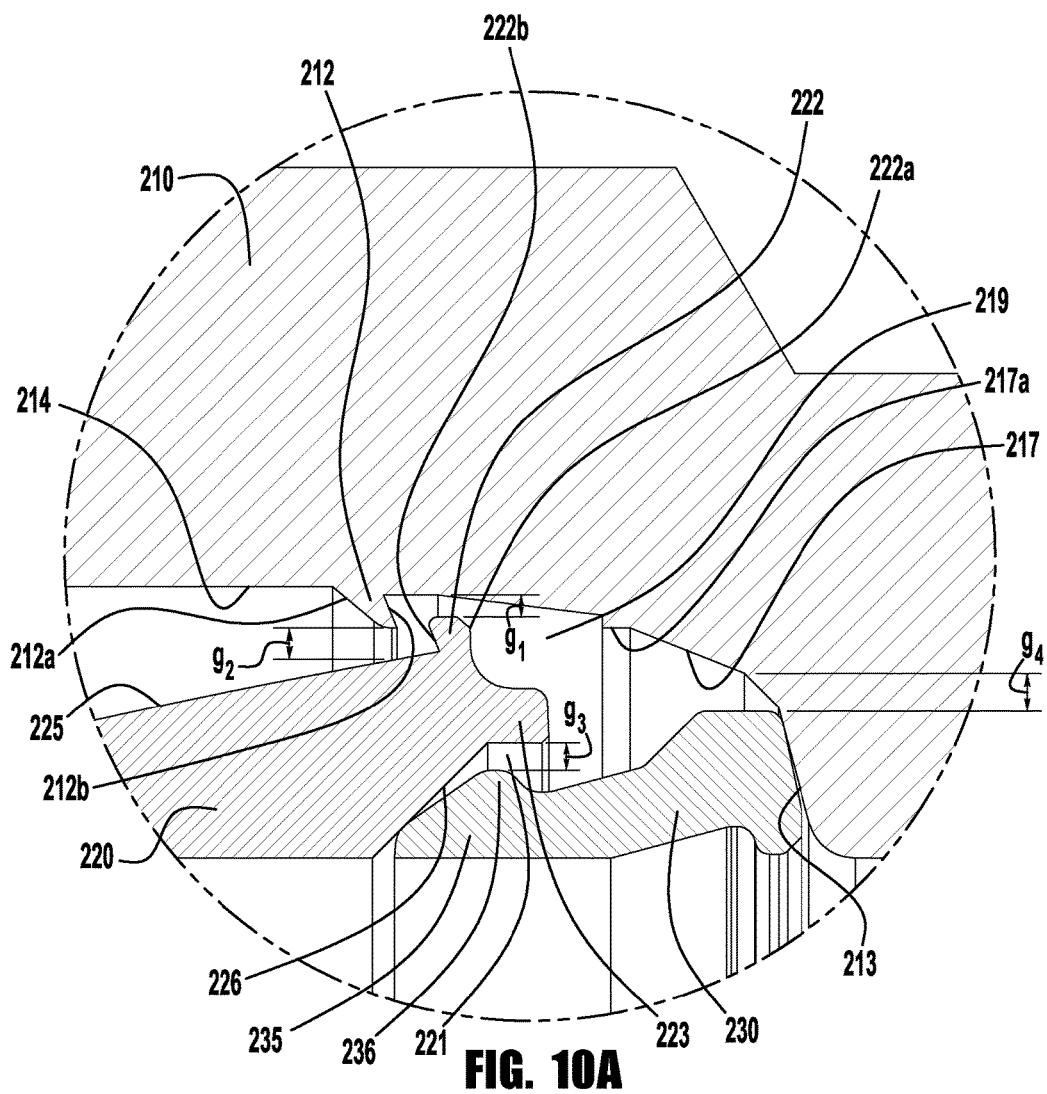
FIG. 10A is an enlarged longitudinal cross-sectional partial view of the subassembly of FIG. 10.
Figure 11:
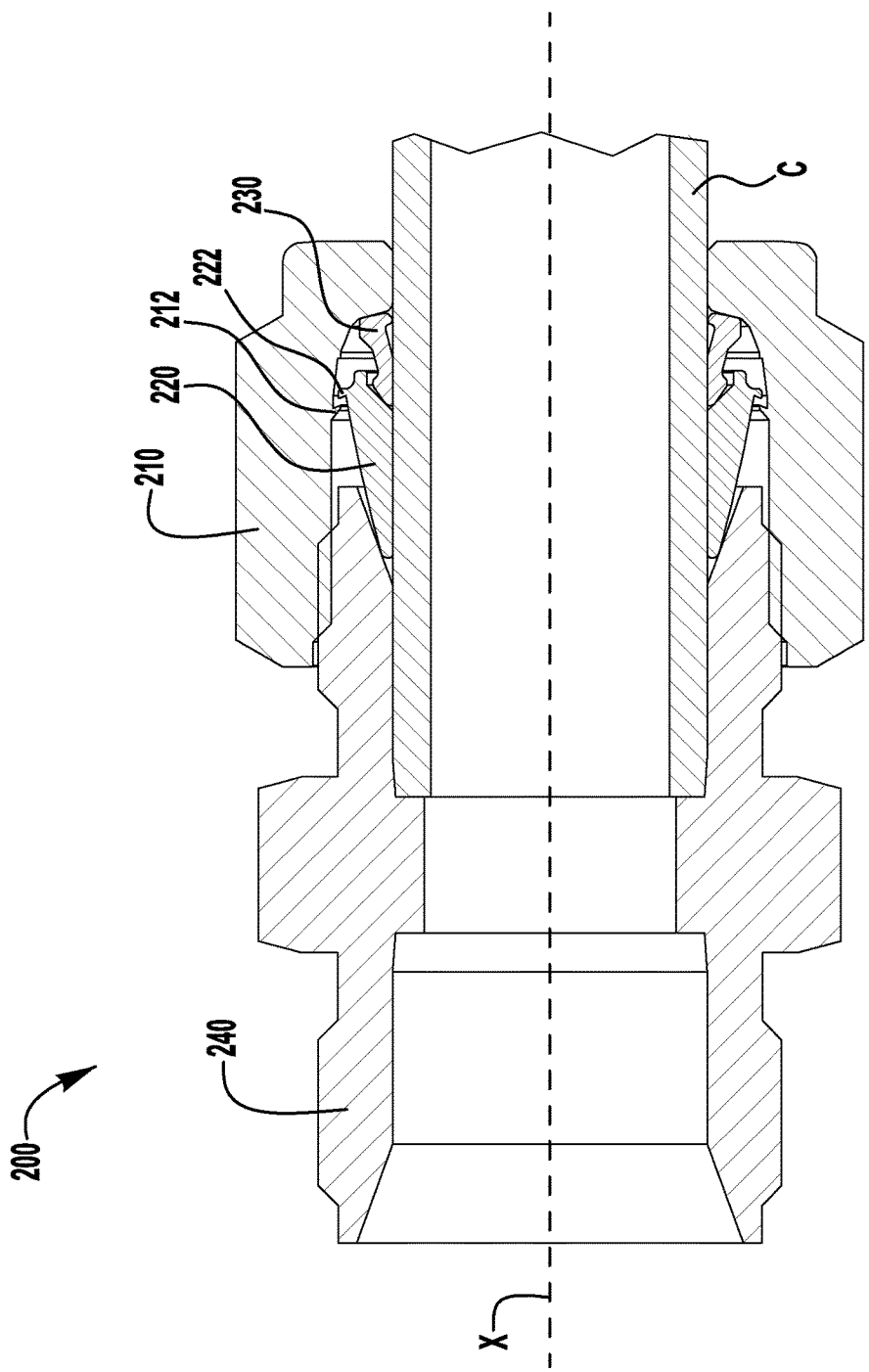
FIG. 11 is a longitudinal cross-sectional view of a conduit fitting assembly using the subassembly of FIG. 10, with the fitting assembly illustrated in a finger tight condition.

To permit preassembly of the nut 210 and ferrules 220, 230, the first and second flanges 212, 222 are at least partially elastically radially deformable, such that during installation of the front ferrule 220 into the nut 210, the second flange 222 of the front ferrule may be pressed past the first flange 212 of the nut and into an interior recess 219 of the nut, recessed from and rearward of the first flange 212. The elastically deformed flange(s) 212, 222 then snap back into radial alignment for cartridged retention of the ferrules 220, 230 in the interior cavity 215 of the nut 210 (as shown in FIGS. 10 and 10A).

Figure 9:
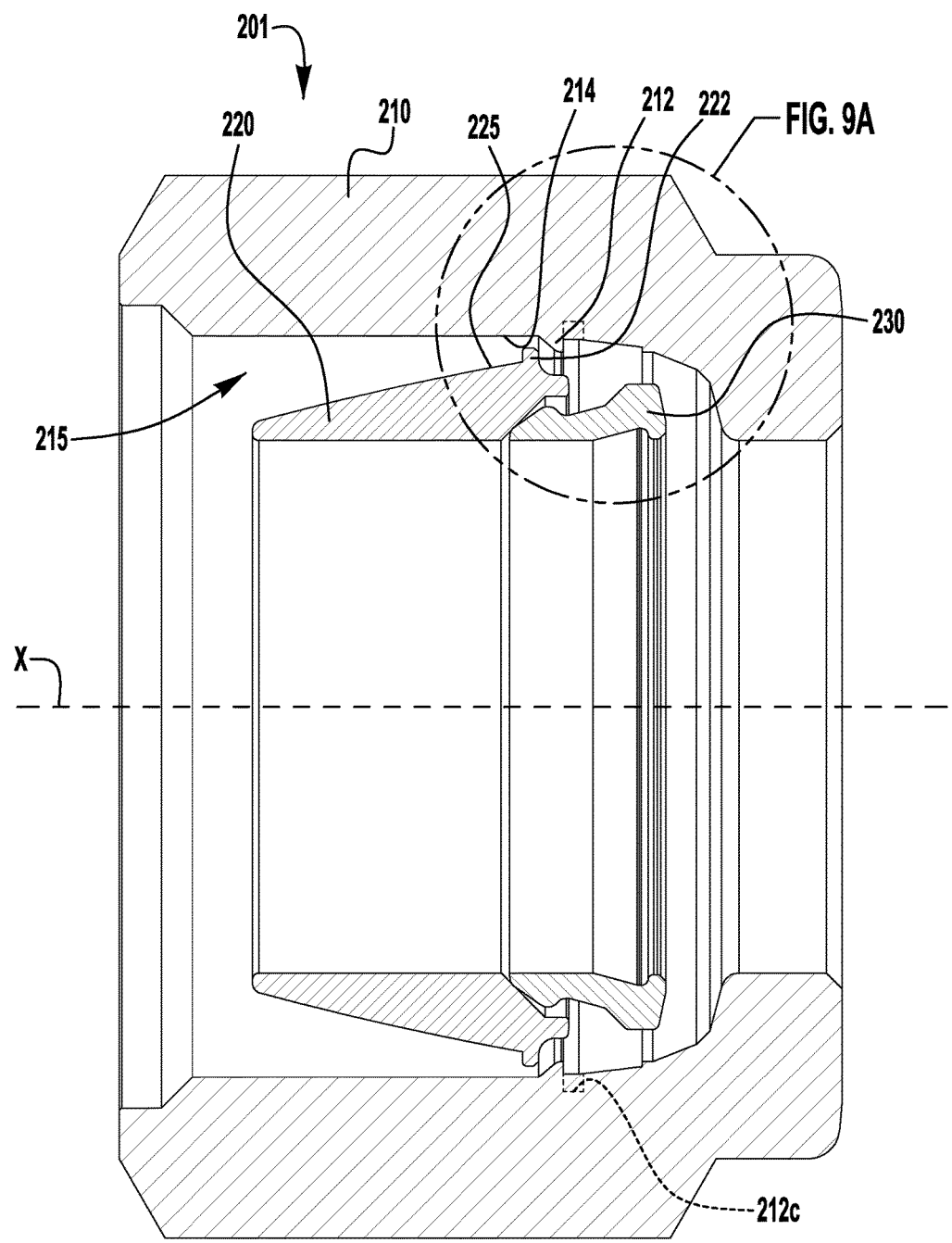
FIG. 9 is a longitudinal cross-sectional view of an exemplary fitting nut and ferrules, illustrating exemplary features of one or more of the inventions herein, shown prior to assembly as a conduit fitting cartridge.
Figure 9A:
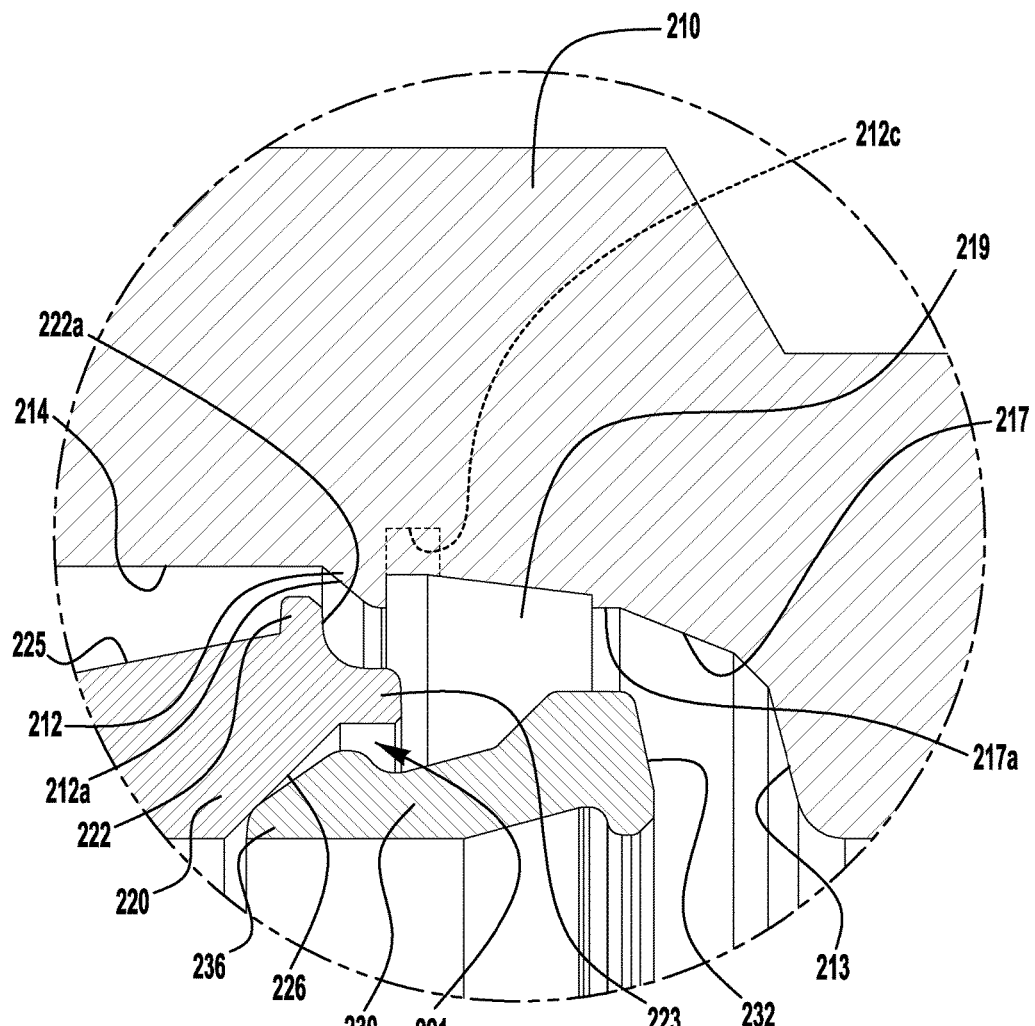
FIG. 9A is an enlarged longitudinal cross-sectional partial view of the nut and ferrules of FIG. 9.

To facilitate elastic radial deformation of the first and second flanges 212, 222, either or both of the first and second flanges are provided with tapered camming surfaces 212a, 222a, adapted to engage each other during preassembly (see FIG. 9A) to impart radial compression forces on the flanges when an axial installation force is applied to the front ferrule 220. In the illustrated embodiment, the first flange 212 is provided with an inward tapered front camming surface 212a that engages an outward tapered rear camming surface 222a of the second flange 222 during installation of the front ferrule 220 in the nut 210, to elastically bend or otherwise deform the second flange radially inward.

To facilitate retaining interengagement of the first and second flanges 212, 222 after installation of the front ferrule 220 in the nut 210, either or both of the first and second flanges are provided with tapered interengaging surfaces 212b, 222b (see FIG. 10A) that interlock or hook together when a forward axial force is applied to the installed front ferrule 220 or when a rearward axial force is applied to the nut 210. In the illustrated embodiment, an outward tapered rear interengaging surface 212b of the first flange 212 is shaped to interlock with an inward tapered front interengaging surface 222b of the second flange 222. This hooked or interlocking engagement serves to prevent or reduce radial deformation of the flanges 212, 222 from this forward axial force, and reinforces retention of the ferrules 220, 230 against shock, vibration, or forces applied to the fitting during disassembly. The interlocking engagement of the flanges 212, 222 may also assist with conduit pull-out from the fitting body 240 during fitting disassembly, as the axial pulling force applied to the front ferrule during loosening or unthreading of the nut is transmitted to the conduit.

Additionally, to further facilitate or strengthen retaining interengagement of the first and second flanges 212, 222 after preassembly or cartridging of the ferrules 220, 230 in the fitting nut 210, the fitting nut 210 may be provided with a recess (shown in phantom at 212c in FIG. 9) rearward of the first flange 212. When the second flange 222 of the front ferrule 220 has been axially pressed past the first flange 212 of the fitting nut 210 during preassembly or cartridging of the front ferrule 220, the second flange 222 may elastically expand or snap radially outward into the recess 212c for strengthened retaining interengagement. Additionally or alternatively, when a forward axial force is applied to the retained front ferrule 220, the second flange 222 is permitted to deform or pivot axially rearward and radially outward, in response to axial engagement of the inward tapered front interengaging surface 222b of the second flange 222 with the outward tapered rear interengaging surface 212b of the first flange 212, such that an outer radial end portion of the second flange is received (or more deeply received) in the recess 212c to further interlock the front ferrule 220 with the fitting nut 210. The use of an interlocking recess may also allow for enhanced interlocking engagement with a fitting nut having a substantially radial (non-tapered) or inward tapered rear interengaging surface, similar to the embodiments of FIGS. 7D and 7E.

The tapered interengaging surfaces 212b, 222b of the first and second flanges 212, 222 may be machined, extruded, molded, or otherwise formed in this tapered orientation during manufacturing of the nut and front ferrule. In other embodiments, plastic deformation (e.g., bending or compressing) of either or both of the first and second flanges during installation of the front ferrule in the nut may cause these interengaging surfaces to assume a tapered orientation, or to assume a steeper or more acute tapered orientation, for example, to promote an enhanced or strengthened interlocking engagement of the flanges.

When the fitting 200 is pulled up on a conduit C, the first and second flanges 212, 222 may be maintained in radial alignment to retain the nut 210 and ferrules 220, 230 as a cartridged subassembly even after subsequent fitting disassembly (see FIG. 13), as described above. According to another aspect of the present application, the fitting components may be configured to be modified during pull-up (e.g., full or partial pull-up) to increase, enhance, or strengthen the flange interengagement and the resulting ferrule retention by the nut.

Many different features or conditions of the fitting components may provide for increased or strengthened flange interengagement upon pull-up. As one example, interior surfaces of the nut may be configured to plastically bend or otherwise deform the second flange 222 of the front ferrule 220 to orient the tapered interengaging surface 222b of the front ferrule at a smaller or steeper acute angle from axial orientation. In the illustrated embodiment, the nut 210 includes a tapered wall surface 217 extending between the first flange 212 and the drive surface 213. The tapered wall surface 217 is contoured to provide a controlled amount of deformation of the second flange 222. The tapered wall surface 217 may additionally apply, through the front ferrule 220, an increased radial load on a front nose portion 235 of the rear ferrule 230 to facilitate indentation of the rear ferrule nose portion into the conduit C during pull-up.

In some embodiments, the tapered wall surface 217 may be contoured such that when the fitting has been tightened enough to advance the front ferrule past a predetermined position (e.g., corresponding to a partial pull-up, complete initial pull-up, subsequent remake, or an amount consistent with the fitting being over-tightened or having exceeded a desirable number of re-makes), the tapered wall surface 217 functions as a release assist surface and deforms the second flange 222 radially inward enough to radially separate the second flange from the first flange 212 to permit disassembly of the nut 210 from the front ferrule 220 (e.g., for inspection of the ferrules or to provide a positive indication of overtightening or maximum re-makes). During pull-up or re-make of the fitting, this release assist surface 217 may be contoured and positioned to impart a radial compressive force against the second flange 222 to radially separate the second flange from the first flange 112at a predetermined axial advance of the front ferrule 220 with respect to the fitting nut 210, for example, to correspond with a partial pull-up, full initial pull-up, or re-make of the fitting, thereby allowing for subsequent disassembly of the fitting nut 210 from the ferrules 220, 230. The release assist surface 217 may include, for example, one or more of a tapered surface, a curved surface, a stepped surface (e.g., the exemplary step at 217a), and a radially inward projection, which may, but need not, be annular or circumferentially continuous.

As another example of fitting components providing for increased or strengthened flange interengagement upon pull-up, the second flange may be positioned on a portion of the front ferrule that radially expands during pull-up, to provide increased radial alignment between the second flange and the first flange of the nut. In the illustrated embodiment, camming engagement between a front nose portion 235 of the rear ferrule 230 and a rear camming mouth 226 of the front ferrule causes the back end of the front ferrule 220 to radially expand during fitting pull-up. The second flange 222, extending from a rear end portion of the front ferrule outer surface 225, expands radially due to this back end expansion, thereby increasing alignment of the second flange 222 with the first flange 212, and strengthening interengagement between the first and second flanges when the front ferrule is forced into a forwardmost axial position.

In an exemplary method of assembling a fitting component and conduit gripping device subassembly, an annular fitting component is provided with a first projection extending radially inward from the interior wall, and at least a first conduit gripping device is provided with a second projection extending radially outward of an outer surface of the first conduit gripping device. The second projection is radially aligned with the first projection, and the second projection is axially forced against the first projection to radially deform at least one of the first and second projections out of radial alignment with the other of the first and second projections. The second projection is axially pressed past the first projection, with at least one of the radially deformed first and second projections elastically returning to at least partial radial alignment with the other of the first and second projections to retain the first conduit gripping device with the annular fitting component.

In an exemplary method of assembling a fitting, a subassembly is provided with an annular first fitting component having an interior wall extending axially from a forward end to a rearward end, and a first projection extending radially inward from the interior wall, and at least a first conduit gripping device received within the annular fitting component and including a second projection extending radially outward of an outer surface of the first conduit gripping device. The first projection is radially aligned with the second projection to block axial withdrawal of the first conduit gripping device from the first fitting component. The first fitting component is assembled with a second fitting component on a conduit such that the first conduit gripping device grips against the conduit, and the second projection is modified to increase interengagement of the second projection with the first projection when the first conduit gripping device is in a forward-most position with respect to the first fitting component.

Figure 14:
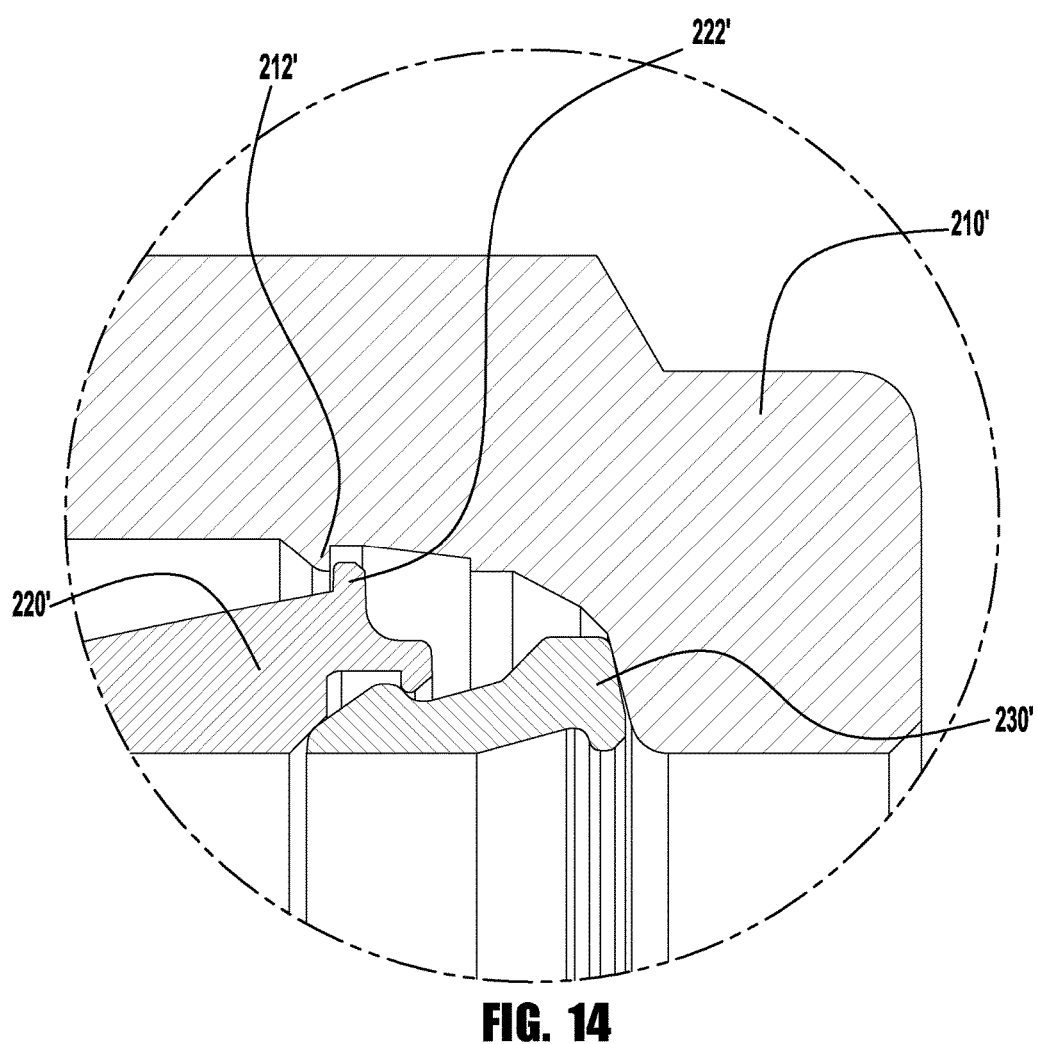
FIG. 14 is an enlarged longitudinal cross-sectional partial view of an exemplary fitting nut and ferrules, illustrating exemplary features of one or more of the inventions herein, shown assembled as a conduit fitting cartridge.

As with the embodiments of FIGS. 1A-5, as shown in FIG. 14, the front and rear ferrules 220', 230' may themselves include features for cartridging together prior to assembly with the fitting nut 210', similar to the cartridging ferrule embodiments described above and in the above incorporated '508 Application. While a cartridging connection between the front and rear ferrules may be unnecessary since the rear ferrule is captured between the front ferrule and the drive surface of the fitting nut, according to another inventive aspect of the present application, the front and rear ferrules may be provided with interengaging ferrule alignment features that do not axially capture or interlock the ferrules together (i.e., are non-cartridging), but still facilitate desired axial and radial alignment of the front and rear ferrules.

As one example, the front ferrule 220 may be provided with an outboard axial projection 223 (see FIG. 9A) extending axially rearward from a rear end portion of the front ferrule 220, and radially inward of the ferrule retaining flange 222 (or other such radially outer retaining feature on the ferrule). The outboard axial projection 223 defines a rear bore 221, extending rearward from the rear camming mouth 226, into which a radially outer front portion 236 of the rear ferrule 230 may be received (see FIG. 9A). As shown, the radially outer front portion may, but need not, be radially enlarged relative to a central axial portion of the rear ferrule (e.g., a radially enlarged crown portion that facilitates ferrule cartridging, as described herein and in the above incorporated '508 Application). This arrangement may facilitate suitable axial and radial alignment of the front and rear ferrules 220, 230 during cartridging of the ferrules with the nut 210, and within the cartridged subassembly. As one benefit, this alignment can ensure sufficient radial alignment of the front and rear ferrules with each other, for example, for substantial radial alignment of the axial bores of the front and rear ferrules for ease of tube installation, for substantial radial alignment of the front ferrule camming mouth 226 with the rear ferrule nose portion 235, and to prevent misalignment of the ferrules within the cartridged assembly (e.g., due to impact or vibration). As another benefit, this alignment can provide for sufficient concentricity of the rear ferrule 230 within the nut 210, for example, for proper radial alignment of the rear ferrule driven surface 232 with the nut drive surface 213. As still another benefit, this alignment can provide for sufficient concentricity of the front ferrule 220 within the nut 210, for example, for proper radial alignment of the front ferrule retaining flange 222 and the nut retaining flange 212 to prevent misalignment and dislodging of the front ferrule from the nut of the cartridged assembly (e.g., due to impact or vibration).

To control radial and axial alignment of the ferrules 220, 230, with each other and with the cartridging nut 210, the nut and ferrules may be dimensioned such that the radial gaps between the nut and ferrule interengaging surfaces, when centered on a longitudinal axis X (as shown, for example, in FIG. 10), are minimized, including, for example, as shown in FIG. 10A: a radial gap g1 between the outer diameter of the front ferrule retaining flange 222 and the aligned interior recess 219 of the nut 210 (e.g., in the front ferrule's forward-most cartridged position); a radial gap g2 between the inner diameter of the nut retaining flange 212 and the aligned outer surface of the front ferrule 220 (e.g., in the front ferrule's rearward-most cartridged position); a radial gap g3 between the rear ferrule's radially outer front portion 236 and the aligned front ferrule rear bore 221 (e.g., in the front ferrule's forward-most cartridged position and the rear ferrule's rearward most cartridged position), and a radial gap g4 between the radially outer edge of the rear ferrule driven surface 232 and the aligned tapered end portion of the nut tapered wall surface 217 (e.g., in the rear ferrule's forward-most cartridged position). These gaps may be sized to be large enough to avoid a press fit or interference fit between the interengaging surfaces of the nut and ferrules, while reducing or minimizing radial movement radial movement as discussed about. For example, one or more of the radial gaps g1, g2, g3, g4 may be sized between about 0.00005 inches and about 0.015 inches, or between about 0.00005 inches and about 0.006 inches, or between about 0.00005 inches and about 0.003 inches, or between about 0.0005 inches and about 0.001 inches. In one embodiment, either or both of the rear ferrule radial gaps g3, g4 may be smaller than either or both of the front ferrule-nut radial gaps g1, g2, and may be reduced or minimized to further limit radial movement of the front ferrule 220, beyond the limits to radial movement of the front ferrule caused by the front ferrule-nut radial gaps g1, g2, for example, to prevent or impede misalignment of the retaining flanges 212, 222 and unintended disengagement of the front ferrule from the nut and ferrule subassembly. For example, the sum of the rear ferrule radial gaps g3, g4 may be smaller than either or both of the front ferrule-nut radial gaps g1, g2.

Figure 15A:
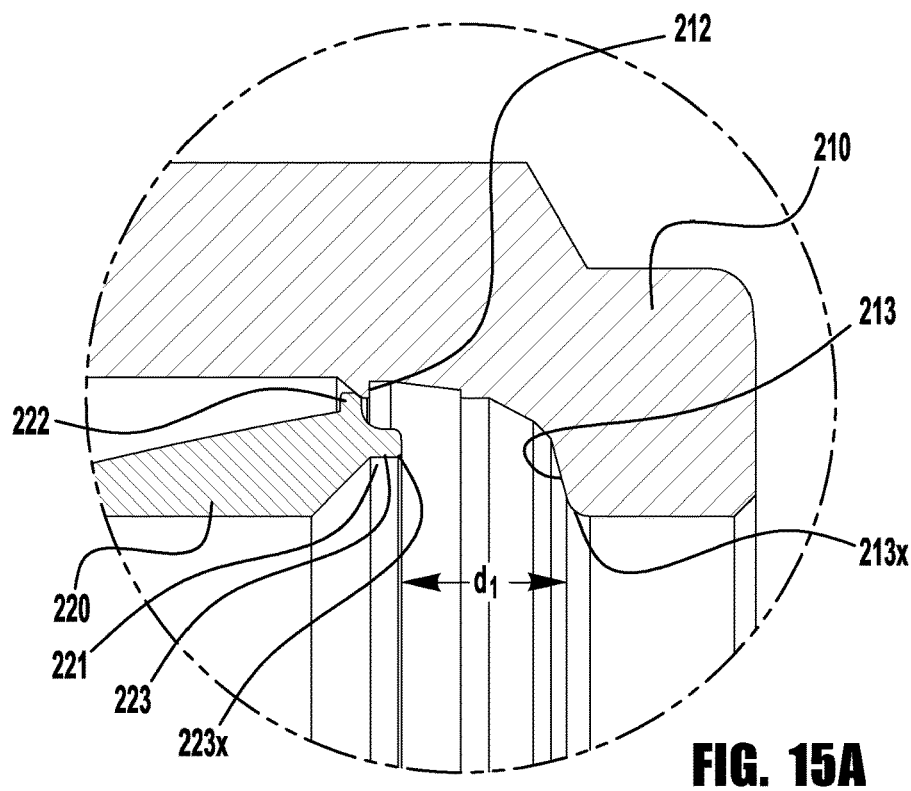
FIG. 15A is an enlarged longitudinal cross-sectional partial view of the fitting nut and front ferrule of FIG. 9, shown with the front ferrule in the rearward-most uncartridged position, and with the rear ferrule removed for clarity.
Figure 15B:
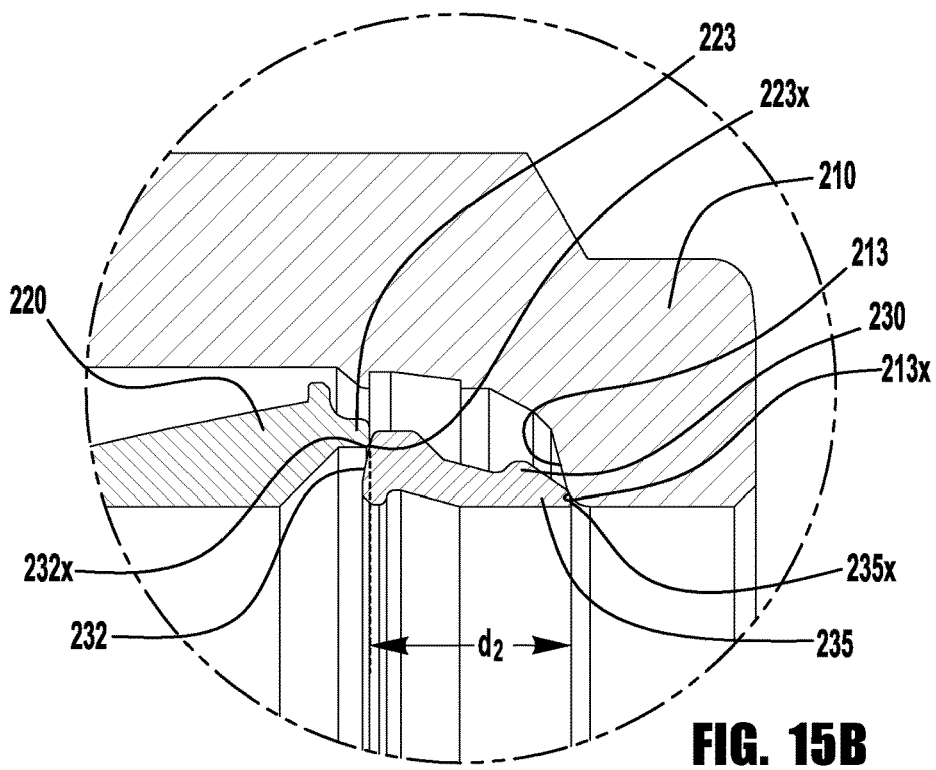
FIG. 15B is an enlarged longitudinal cross-sectional partial view of the fitting nut and front ferrules of FIG. 9, shown with the rear ferrule inverted in the fitting nut, such that the front ferrule is blocked from axially advancing to a cartridged position.

Further, the extended outboard axial projection 223 of the front ferrule 220 may prevent backwards installation of the rear ferrule 230, by sizing the outboard axial projection 223 such that a backwards installed rear ferrule would prevent snap-fit installation of the front ferrule 220 into the nut 210. To provide for this misassembly prevention, the outboard axial projection 223 may be sized such that when the front ferrule 220 is in the rearward most un-cartridged or non-retained position (i.e., with the rear surface of the ferrule retaining flange 222 engaging the front surface of the nut retaining flange 212, as shown in FIG. 15A), the axial distance d1 between the backwards rear ferrule engaging portion 213x of the nut drive surface 213 and the backwards rear ferrule engaging portion 223x of the outboard axial projection 223 is smaller than the axial distance d2 between the backwards rear ferrule engaged portion 235x of the rear ferrule nose 235 and the backwards rear ferrule engaged portion 232x of the rear ferrule driven surface 232. Alternatively, the outboard axial projection may be sized such that engagement between the outboard axial projection of the front ferrule and the driven surface of the backwards installed rear ferrule prevents the threads of the fitting nut from engaging the threads of the fitting body.

As discussed above, to avoid an additional cartridging step, and/or to avoid any resistance between the front and rear ferrules during assembly, the rear bore 221 of the front ferrule may be sized and shaped to provide for slip fit receipt of the radially outer front portion 236 of the rear ferrule, or sized to permit insertion of the front end portion of the rear ferrule without the front end portion of the rear ferrule contacting an internal surface of the rear bore. As such, unlike the cartridging front ferrule 220' of FIG. 14, the bore 221 in the outboard axial projection 223 may be substantially cylindrical or outwardly tapered (or otherwise outwardly or rearwardly non-reducing) to eliminate any resistance to insertion or withdrawal of the rear ferrule radially outer front portion 236 in the rear bore 221.

Figure 16:
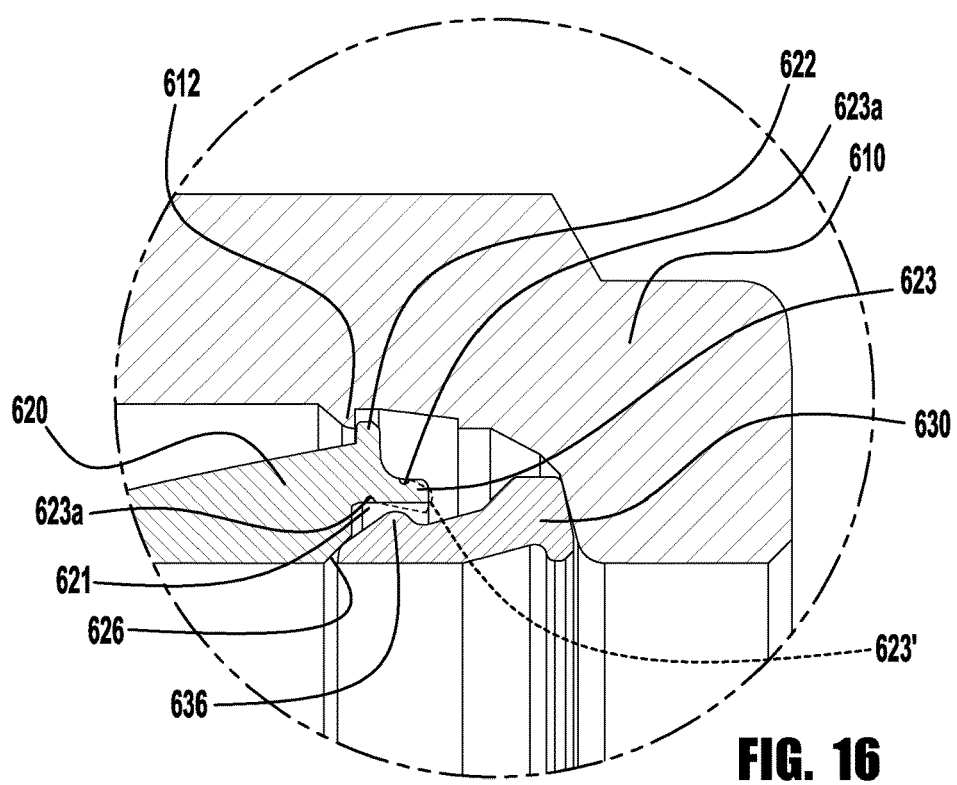
FIG. 16 is an enlarged longitudinal cross-sectional partial view of an exemplary fitting nut and ferrules, illustrating exemplary features of one or more of the inventions herein, shown assembled as a conduit fitting cartridge.

In another embodiment, a rear bore defining outboard axial projection on a front ferrule, sized for loose or slip fit insertion of a radially outer front (e.g., crown) portion of a rear ferrule, may be configured to be optionally crimped, rolled, peened, or otherwise radially compressed after insertion of the rear ferrule crown portion, for cartridged retention of the rear ferrule with the front ferrule, at least prior to installation of the ferrules onto a tube end as part of a fitting assembly. FIG. 16 illustrates an exemplary nut and ferrule subassembly including a front ferrule 620 provided with an outboard axial projection 623 extending axially rearward from a rear end portion of the front ferrule, and radially inward of a ferrule retaining flange 622 (or other such radially outer retaining feature on the ferrule). The outboard axial projection 623 defines a rear bore 621, extending rearward from the rear camming mouth 626, into which a radially outer front portion 636 (e.g., a crown portion) of the rear ferrule 630 is received. The outboard axial projection 623 is configured to be optionally crimped, rolled, peened, or otherwise radially compressed over the rear ferrule radially outer front portion 636, as shown in phantom at 623', to axially and radially capture the radially outer front portion within the bore 621. As shown, the outboard axial projection 623 may be provided with one or more grooves 623a or other such features (e.g., notches, perforations) to facilitate radial compression. The front and rear ferrules 620, 630 of the cartridged subassembly, may be configured to separate from each other upon fitting pull-up, similar to the cartridging ferrule embodiments described above and in the above incorporated '508 Application.

The ferrules 620, 630 may be configured to be fully functional without the radial compression cartridging operation, such that this cartridging operation may be optionally selected or omitted depending on whether an initial ferrule cartridge subassembly is desired. Similar to the ferrules 220, 230, the optionally cartridge-able ferrules 620, 630 may also be dimensioned to facilitate suitable axial and radial alignment of the front and rear ferrules 620, 630 during cartridging of the ferrules with the nut 210 (and within the cartridged subassembly), whether or not the ferrules 620, 630 are cartridged together, for example, to ensure sufficient radial alignment of the front and rear ferrules with each other, sufficient concentricity of the rear ferrule 630 within the nut 610, and sufficient concentricity of the front ferrule 620 within the nut 610, as described in greater detail above. Likewise, the optionally cartridge-able ferrules 620, 630 may also be dimensioned to prevent backwards installation of the rear ferrule 630, by sizing the outboard axial projection 623 such that a backwards installed rear ferrule 630 would prevent snap-fit installation of the front ferrule 620 into the nut 610.

In another embodiment, a non-cartridging fitting nut may be provided with a front ferrule including an outboard axial projection providing for either or both of (a) an optional radial compression of the outboard axial projection to cartridge a rear ferrule with the front ferrule, at least prior to installation of the ferrules on a tube end when assembled with a fitting assembly, and (b) suitable axial and radial alignment of the front and rear ferrules during assembly of the ferrules in a fitting, for example, to ensure sufficient radial alignment of the front and rear ferrules with each other, sufficient concentricity of the rear ferrule within the nut, and sufficient concentricity of the front ferrule within the nut, as described in greater detail above.

Figure 17:
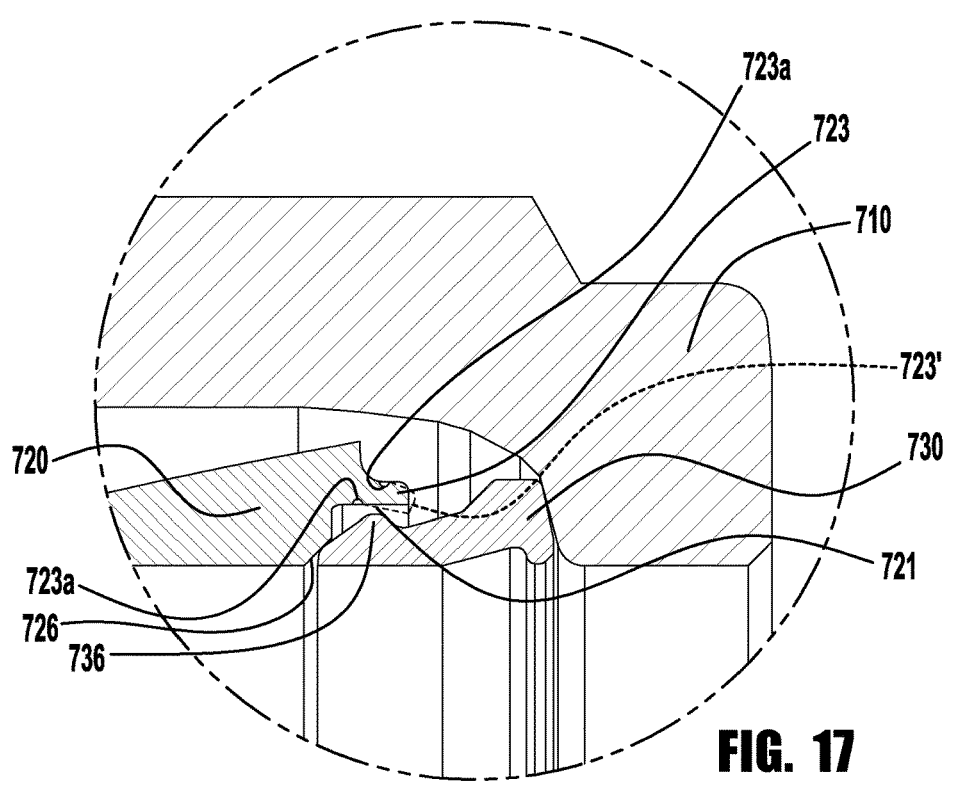
FIG. 17 is an enlarged longitudinal cross-sectional partial view of an exemplary fitting nut and ferrules, illustrating exemplary features of one or more of the inventions herein, shown in a loosely assembled condition.

FIG. 17 illustrates an exemplary nut and ferrule subassembly including a front ferrule 720 provided with an outboard axial projection 723 extending axially rearward from a rear end portion of the front ferrule, and radially inward of a radially outermost portion of the ferrule. The outboard axial projection 723 defines a rear bore 721, extending rearward from the rear camming mouth 726, into which a radially outer front portion 736 (e.g., a radially extending crown portion) of the rear ferrule 730 is received. The outboard axial projection 723 may, but need not, be configured to be optionally crimped, rolled, peened, or otherwise radially compressed over the rear ferrule radially outer front portion 736, as shown in phantom at 723', to axially and radially capture the radially outer front portion within the bore 721. As shown, the outboard axial projection 723 may be provided with one or more grooves 723a or other such features (e.g., notches, perforations) to facilitate radial compression. The front and rear ferrules 720, 730 of the cartridged subassembly, may be configured to separate from each other upon fitting pull-up, similar to the cartridging ferrule embodiments described above and in the above incorporated '508 Application.

Similar to the ferrules 220, 230, the ferrules 720, 730, whether or not cartridge-able, may, but need not, be dimensioned to facilitate suitable axial and radial alignment of the front and rear ferrules 720, 730 during assembly of the ferrules with a fitting assembly, for example, to ensure sufficient radial alignment of the front and rear ferrules with each other, sufficient concentricity of the rear ferrule 730 within the nut 710, and sufficient concentricity of the front ferrule 720 within the nut 710, as described in greater detail above. 623 extending axially rearward from a rear end portion of the front ferrule, and radially inward of a ferrule retaining flange 622 (or other such radially outer retaining feature on the ferrule).

Still other features may be utilized to facilitate installation and use of the cartridged subassembly. For example, the nut may be provided with an external visual indicator (e.g., laser marking, knurling, ridge, band) to identify the nut as corresponding to a permanently cartridged or releasably cartridged nut and ferrule subassembly.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A preassembly for a conduit fitting, comprising:
   a fitting nut having an interior wall extending axially from a forward end to a rearward end, and a first retaining feature;
   a front ferrule received within the fitting nut and including a second retaining feature extending radially outward of an outer surface of the front ferrule, a rear camming mouth, and an outboard axial projection extending rearward from a rear end portion of the front ferrule, entirely radially inward and axially rearward of the second retaining feature, the outboard axial projection defining a rear bore extending axially rearward from the rear camming mouth; and
   a rear ferrule received within the fitting nut and disposed between the front ferrule and a rear drive surface of the fitting nut, with an outer radial front end portion of the rear ferrule received in slip fit engagement within the rear bore of the front ferrule and a front camming surface of the rear ferrule, forward of the outer radial front end portion, engageable with the front ferrule camming mouth;
   wherein the first retaining feature is radially aligned with and axially forward of the second retaining feature to impede axial withdrawal of the front ferrule from the fitting nut.

2. The preassembly of claim 1, wherein the rear bore is outwardly non-reducing.

3. The preassembly of claim 1, wherein when the front ferrule is in a rearward most non-retained position, a first axial distance between a backwards rear ferrule engaging portion of the fitting nut drive surface and a backwards rear ferrule engaging portion of the outboard axial projection is smaller than a second axial distance between a backwards rear ferrule engaged portion of the rear ferrule front camming surface and a backwards rear ferrule engaged portion of a driven surface of the rear ferrule.

4. The preassembly of claim 1, wherein the rear bore is sized to permit insertion of the front end portion of the rear ferrule without the front end portion of the rear ferrule contacting an internal surface of the rear bore.

5. The preassembly of claim 1, wherein when the fitting nut and the first and second ferrules are centered on a longitudinal axis, a radial gap between an outer diameter of the second retaining feature and an aligned inner surface of the fitting nut is between about 0.00005 inches and about 0.003 inches when the front ferrule is in a forward-most retained position within the fitting nut.

6. The preassembly of claim 1, wherein when the fitting nut and the first and second ferrules are centered on a longitudinal axis, a radial gap between an outer diameter of the second retaining feature and an aligned inner surface of the fitting nut is between about 0.0005 inches and about 0.001 inches when the front ferrule is in a forward-most retained position within the fitting nut.

7. The preassembly of claim 1, wherein when the fitting nut and the first and second ferrules are centered on a longitudinal axis, a radial gap between an inner diameter of the first retaining feature and an aligned outer surface of the front ferrule is between about 0.0005 inches and about 0.001 inches when the front ferrule is in a rearward-most position within the fitting nut.

8. The preassembly of claim 1, wherein when the fitting nut and the first and second ferrules are centered on a longitudinal axis, a radial gap between the outer radial front end portion of the rear ferrule and an aligned interior surface of the rear bore is between about 0.00005 inches and about 0.003 inches when the front ferrule is in a forward-most retained position within the fitting nut and the rear ferrule is in a rearward-most position within the fitting nut.

9. The preassembly of claim 1, wherein when the fitting nut and the first and second ferrules are centered on a longitudinal axis, a radial gap between the outer radial front end portion of the rear ferrule and an aligned interior surface of the rear bore is between about 0.0005 inches and about 0.001 inches when the front ferrule is in a forward-most retained position within the fitting nut and the rear ferrule is in a rearward-most position within the fitting nut.

10. The preassembly of claim 1, wherein when the fitting nut and the first and second ferrules are centered on a longitudinal axis, a radial gap between a radially outer edge of a driven surface of the rear ferrule and an aligned interior surface of the fitting nut is between about 0.00005 inches and about 0.003 inches when the rear ferrule is in a forward-most retained position within the annular fitting component.

11. The preassembly of claim 1, wherein when the fitting nut and the first and second ferrules are centered on a longitudinal axis, a radial gap between a radially outer edge of a driven surface of the rear ferrule and an aligned interior surface of the fitting nut is between about 0.0005 inches and about 0.001 inches when the rear ferrule is in a forward-most retained position within the annular fitting component.

12. The preassembly of claim 1, wherein when the fitting nut and the first and second ferrules are centered on a longitudinal axis, a sum of a first radial gap between the outer radial front end portion of the rear ferrule and an aligned interior surface of the rear bore and a second radial gap between a radially outer edge of a driven surface of the rear ferrule and an aligned interior surface of the fitting nut is smaller than a third radial gap between an outer diameter of the second retaining feature and an aligned inner surface of the fitting nut.

13. The preassembly of claim 1, wherein when the fitting nut and the first and second ferrules are centered on a longitudinal axis, a sum of a first radial gap between the outer radial front end portion of the rear ferrule and an aligned interior surface of the rear bore and a second radial gap between a radially outer edge of a driven surface of the rear ferrule and an aligned interior surface of the fitting nut is smaller than a third radial gap between an inner diameter of the first retaining feature and an aligned outer surface of the front ferrule.

14. A fitting assembly comprising:
   an annular first fitting component having an interior wall extending axially from a forward end to a rearward end, and a first retaining flange extending radially inward from the interior wall;
   a second fitting component that assembles with the first fitting component to define an interior volume surrounded by the interior wall of the first fitting component;
   a first conduit gripping device disposed within the interior volume, the first conduit gripping device including a second retaining flange extending radially outward of an outer surface of the first conduit gripping device, and a rear camming mouth; and
   a second conduit gripping device disposed within the interior volume between the first conduit gripping device and a rear drive surface of the first fitting component;
   wherein the first retaining flange is radially aligned with the second retaining flange, such that when the first conduit gripping device is in a forward-most position with respect to the first fitting component, a tapered surface of the first retaining flange interlocks with a tapered surface of the second retaining flange to block axial withdrawal of the first conduit gripping device from the annular first fitting component; and.

15. The fitting assembly of claim 14, wherein the fitting assembly comprises only metal parts.

16. The fitting assembly of claim 14, wherein the fitting assembly comprises stainless steel parts.

17. The fitting assembly of claim 14, wherein the first conduit gripping device is loosely retained with the first fitting component.

18. The fitting assembly of claim 14, wherein the first and second conduit gripping devices comprise front and rear ferrules.

19. The fitting assembly of claim 14, wherein the first conduit gripping device includes an outboard axial projection extending rearward from a rear end portion of the first conduit gripping device, entirely radially inward of the second retaining flange, the outboard axial projection defining a rear bore.

20. The fitting assembly of claim 19, wherein the rear bore is outwardly non-reducing.

21. The fitting assembly of claim 19, wherein the rear bore is sized to permit insertion of the front end portion of the second conduit gripping device without the front end portion of the second conduit gripping device contacting an internal surface of the rear bore.

* * * * *